United States Patent [19]

Girsh

[11] Patent Number: 5,753,296
[45] Date of Patent: May 19, 1998

[54] PRODUCT AND PROCESS OF MAKING HYPOALLERGENIC CHOCOLATE COMPOSITIONS

[75] Inventor: Leonard S. Girsh, South Palm Beach, Fla.

[73] Assignee: Immunopath Profile, Inc., Palm Beach, Fla.

[21] Appl. No.: 591,503

[22] PCT Filed: Aug. 2, 1994

[86] PCT No.: PCT/US94/08766

§ 371 Date: Feb. 2, 1996

§ 102(e) Date: Feb. 2, 1996

[87] PCT Pub. No.: WO95/03708

PCT Pub. Date: Feb. 9, 1995

Related U.S. Application Data

[63] Continuation-in-part of Ser. No. 100,905, Aug. 3, 1993, abandoned.

[51] Int. Cl.[6] .................................................. A23G 1/00
[52] U.S. Cl. ...................... 426/593; 426/425; 426/430; 426/434; 426/660
[58] Field of Search ................................. 426/425, 430, 426/434, 660, 593

[56] References Cited

U.S. PATENT DOCUMENTS

| | | | |
|---|---|---|---|
| 3,923,847 | 12/1975 | Roselius et al. | 260/412.8 |
| 3,939,281 | 2/1976 | Schwengers | 426/11 |
| 4,078,093 | 3/1978 | Girsh | 426/660 |
| 4,810,519 | 3/1989 | Myers et al. | 426/460 |
| 4,954,361 | 9/1990 | Girsh | 426/580 |
| 5,064,674 | 11/1991 | Girsh | 426/580 |
| 5,112,636 | 5/1992 | Girsh | 426/581 |
| 5,186,971 | 2/1993 | Girsh | 426/580 |
| 5,204,134 | 4/1993 | Girsh | 426/580 |

OTHER PUBLICATIONS

Geilman et al., Production of an Electrolyte Beverage from Milk Permeate *Daily Science* 75:2364–2369 (1992).

*Primary Examiner*—Helen Pratt
*Attorney, Agent, or Firm*—Seidel, Gonda, Lavorgna & Monaco, PC

[57] ABSTRACT

Supercritical solvent-treated cocoa powder is used as a flavoring to provide hypoallergenic chocolate-flavored beverages and confections. The dairy permeate is the product of ultrafiltration of milk or whey, which removes protein allergens. The mouth feel as well as the rheological properties of chocolate are retained with a fat content as low as 25% or less.

108 Claims, No Drawings

PRODUCT AND PROCESS OF MAKING HYPOALLERGENIC CHOCOLATE COMPOSITIONS

This is a continuation-in-part of application Ser. No. 08/100,905, filed Aug. 3, 1993, now abandoned.

FIELD OF THE INVENTION

The invention relates to chocolate and chocolate-style composition and products utilizing the same, such as confections, coatings and beverages.

BACKGROUND OF THE INVENTION

Chocolate contains various allergens. Chocolate allergy is common in both adults and children. The symptoms include mild to severe allergic skin eruptions, respiratory tract allergy (allergic rhinitis and asthma), gastrointestinal reactions, migraine and allergic anaphylaxis. Because of the widespread use of chocolate as a component or flavoring in food products, there is a need for a hypoallergenic chocolate having the taste of natural chocolate, but lacking in allergenicity.

Chocolate is manufactured from the beans of the *Theobroma cacao* tree. The shelled beans are broken into fragments called nibs. The nibs are finely ground into a liquid which is free flowing above its melting point (94°–96° F.). The liquid at body temperature is known as "chocolate liquor". This liquor comprises cocoa butter and cocoa powder. When chocolate liquor is heated and placed under pressure, the cocoa butter, which is fat, is squeezed out of the liquor and separated from the remaining mass of material. The remaining mass is finely ground to produce cocoa powder. The allergenic protein-containing component most evident resides in the unprocessed native chocolate liquor.

Although cocoa powder is used in some chocolate-flavored food products, it is the chocolate liquor which is primarily used in chocolate-flavored food products such as chocolate bars and chocolate confections. Regardless of whether cocoa powder or the complete chocolate liquor is utilized, the product will be allergenic due to the allergenic proteins in the cocoa powder component.

Migraine, in particular, is a common manifestation of chocolate intolerance or allergy. In a double blind study, chocolate ingestion was followed by a typical migraine episode in 5 out of 12 sensitive patients, while none of eight patients challenged with a placebo had an attack (Gibb et al., *Cepahalacia* 11, 93–95, 1991). The study utilized a chocolate prepared from cocoa powder, not complete chocolate liquor, according to the usual method for making chocolate. Had chocolate liquor been used, it is likely that migraine would have been observed in 100% of the sensitive patients.

U. S. Pat. No. 4,078,093 describes a hypoallergenic chocolate prepared by treating cocoa powder so as to denature substantially all of the protein allergens which cause chocolate allergies. Denaturation is achieved by a prolonged two-step heat treatment. In a first step, cocoa powder is prepared by heating the ground nibs of roasted cocoa beans at 215°–300° F. at 5500–8000 lb./in$^3$ for 15–90 minutes. In the second step, the cocoa powder prepared in the first step, is combined with cocoa butter and sugar and further heat-treated at 180°–190° F. for 48–96 hours.

While the invention of U.S. Pat. No. 4,078,093 represents an advance in the state of the art, alternate methods of producing hypoallergenic chocolate are desired.

What is needed is a chocolate, and particularly a milk chocolate, which is substantially hypoallergenic, which preferably contains reduced fat, sugar and calories as compared to conventional chocolate, which maintains the good taste of commercial chocolate.

SUMMARY OF THE INVENTION

A chocolate or chocolate-style composition comprises:

(a) at least partially defatted cocoa powder, preferably a cocoa powder rendered essentially hypoallergenic by treatment with a supercritical fluid;

(b) fat;

(c) one or more sweeteners; and (d) optionally, a dairy component.

The dairy component preferably is selected from the group of a dried hypoallergenic dairy permeate, dairy protein concentrate, and milk powder.

Preferably, the composition comprises, on a wt. % basis, from about 0.5 to about 75% of the at least partially defatted cocoa powder, more preferably from about 5 to about 40%, most preferably from about 5 to about 20%; from about 10 to about 25% fat, more preferably from about 20 to about 24%; from about a trace amount to about 75% sweetener, most preferably from about 25 to about 45%; and from about 0 to about 60% of the dairy component, most preferably from about 10 to about 25%. The cocoa powder is advantageously at least 99% fat free.

Preferably, the fat content of the at least partially defatted cocoa powder is not more than about 120% of the cocoa powder by weight, more preferably not more than about 8% by weight of the cocoa powder. Where the cocoa powder has been defatted by treatment with a supercritical fluid, it is rendered essentially hypoallergenic. Cocoa powder so treated, which has a fat content of not more than about it by weight, preferably no more than about 0.05%, most preferably no more than about 0.01%, may form the basis of a hypoallergenic chocolate or chocolate-style composition, as described herein.

According to another embodiment, the invention is directed to a hypoallergenic beverage, wherein there is included as a chocolate-style flavoring, cocoa powder rendered essentially hypoallergenic by treatment with a supercritical fluid solvent. In particular, the beverage may comprise a soda drink comprising soda, water, citric acid defatted cocoa, one or more sweeteners, and optional other flavors, e.g. vanilla.

In another embodiment, the invention is a hypoallergenic pastel confection coating composition comprising fat, sweetener, and hypoallergenic dairy permeate, in the above amounts.

In yet another embodiment, the invention is a hypoallergenic chocolate-style baking flavoring composition comprising from about 0.5 to about 75% defatted cocoa powder, from about 0.05 to about 60% fat, and from 0 to about 5% optional other flavoring, which optional other flavoring is preferably salt and/or vanilla flavor. The cocoa powder has been rendered hypoallergenic by treatment with a supercritical fluid solvent.

In yet another embodiment the invention relates to a method for reducing the allergenicity of foods by treatment with a supercritical fluid solvent.

In another embodiment, the invention is a hypoallergenic composition useful as a component of a hypoallergenic chocolate or chocolate-style composition. The component composition comprises cocoa powder rendered essentially hypoallergenic by treatment with a supercritical fluid solvent, and a dried hypoallergenic dairy permeate. According to a process for preparing such a hypoallergenic composition, the cocoa powder which has been rendered essentially hypoallergenic by treatment with a supercritical fluid solvent and the hypoallergenic dairy permeate are mixed, and the mixture is heat treated at a temperature of at least about 145° F. for at least about one-half hour.

In another embodiment of the invention, a process for preparing a chocolate-flavored composition is provided. An at least partially defatted cocoa powder and a dairy concentrate component are mixed. The dairy component is preferably a dairy, a protein concentrate, a hypoallergenic dairy permeate or a milk powder. The mixture is heat-treated at a temperature of at least about 145° F. for at least about one-half hour. The mixture is dried to a powder. Fat and optional sweetener is added to the mixture. The mixture is then formed into a paste, and the paste is refined to an average particle size of from about 20 to about 30 microns. The refined paste is then heat-treated, preferably with stirring, at a temperature of from about 90° F. to about 200° F., for from about 10 minutes to about 76 hours.

By "dairy component" is meant milk, or any fraction thereof, such as including but not limited to skim milk, whey, whey permeate, dairy permeate, powdered milk, or dairy protein concentrate.

By "dairy permeate" is meant a liquid portion of milk or whey which is collected upon passage of milk or whey, or liquid fraction of milk or whey, through a filter having a molecular size exclusion sufficient to filter out proteins in fact present in the milk or whey, such that the permeate contains no more than about 0.25 wt % milk protein, preferably no more than about 0.1 wt % milk protein, most preferably no more than about 0.025% milk protein. Preferably, the dairy permeate results milk or whey using a filter having a molecular size exclusion of at least as small as about 20 kDa. All or a substantial portion of the moisture is removed by drying. By "dried dairy permeate" is meant a solid which remains after all or a substantial portion of the moisture is removed from the liquid permeate, such as by drying in spray drying oven.

"Milk permeate" means a dairy permeate from filtration of milk. "Whey permeate" means a dairy product from filtration of whey.

By "milk" is meant not only whole milk, but also skim milk or any liquid component thereof. By "whey" is meant the milk component remaining after all or a substantial portion of the fat and casein contained are removed.

By "dairy concentrate" is meant a preparation containing all or part of the dairy protein content of whole milk, but in a form in which the dairy protein exists in a higher concentration than in whole milk.

By "milk protein concentrate" is meant a dairy protein concentrate formed from whole or skim milk. By "whey protein concentrate" is meant a dairy protein concentrate formed from whey.

By "room temperature" is meant 68°–78° F.

All percentages expressed herein are weight percentages, unless indicated otherwise.

DETAILED DESCRIPTION OF THE INVENTION

It has been unexpectedly discovered that the allergenicity of foods may be reduced by treatment with a supercritical fluid, most particularly, supercritical carbon dioxide. Thus, for example, while supercritical fluid has been utilized to extract fat from cocoa powder, it has not been heretofore recognized that the resulting fat-free cocoa powder is substantially hypoallergenic. The powder is rendered hypoallergenic by the defatting procedure alone, without the need for heat denaturation of the protein allergens.

It has now been found that the supercritical fluid treatment, which results in substantially completely defatted cocoa powder (>99% fat-free), surprisingly also results in a powder which is hypoallergenic. Without wishing to be bound by any theory, it is believed that removal of the fat may impact on the three-dimensional structure of the protein component of cocoa powder, such that the human immune system will no longer recognize the proteins contained in the cocoa powder as allergens. The fat-free cocoa powder described herein may be distinguished from the heat treated cocoa powder of U.S. Pat. No. 4,078,093. The latter contains substantial amounts of fat, at least 11%. The fat content of the present fat-free cocoa powder is less than 1 percent, and may be as low as 0.05%, or even 0.0%.

Supercritical $CO_2$ is an ideal solvent. It has the density of a liquid, but is also highly penetrable and diffusible since it has the properties of a gas. It is viricidal, bactericidal and fungicidal.

Without wishing to be bound by any theory, it is believed that supercritical fluid treatment causes a change in the structure of protein. While such a change in the protein component has not actually been observed, it has been noted that supercritical fluid treatment results in a microscopic change to the carbohydrate component of the cocoa powder. The starch granules in chocolate liquor and cocoa powder as processed according to U.S. Pat. No. 4,078,093 gave the "Maltese cross" appearance under polarizing microscopy which is characteristic of intact starch granules. The starch granule was degraded. Supercritical $CO_2$-defatted cocoa powder, however, gave no such characteristic readings under polarizing microscopy, indicating that processing with super- critical $CO_2$, resulting in nearly 100% fat extraction, also had an effect on the granular structure of the starch in the cocoa powder. It is believed that a physical or chemical change in the protein structure of cocoa powder may also occur upon defatting, such that the protein remaining in the cocoa powder is rendered essentially hypoallergenic.

The defatting process results in the elimination of mold, since the coating of microscopic mold spores comprises fat. Supercritical $CO_2$ treatment disrupts cell walls of microorganisms such as highly allergenic mold spores. Removal of viable mold allows the cocoa powder to be utilized in soft drink plants, where the presence of mold is highly undesirable. Moreover, while some viable yeast and mold spores may survive roasting of cocoa beans, those spores will be killed upon supercritical $CO_2$ processing, which is fungicidal as well as bacteriocidal. Many patients allergic to chocolate are also allergic to other mold-containing foods, such as wine and cheese. It is believed that removal of the mold may greatly contribute to the reduced allergenicity of the fat-free cocoa powder. The treatment also disrupts the three-dimensional antigenic and allergenic structures of chocolate which are recognized by the immune system, and which are responsible for the hypersensitive allergic reaction. Essentially fat-free (>99 wt. % fat-free) cocoa powder may be prepared, for example, according to the process of U.S. Pat. No. 3,923,847. Cocoa powder is contacted with $CO_2$ which has been brought to supercritical conditions in respect to temperature and pressure. The fat, in the form of cocoa butter, is extracted from the cocoa powder into the supercritical fluid phase. The cocoa butter may then be recovered from the supercritical fluid phase. According to U.S. Pat. No. 3,923,847, pressures above 75.3 atmospheres, which is approximately the critical pressure of $CO_2$, and temperatures above the $CO_2$ critical temperature (31.6° C.), are necessary for fat extraction. In practice, a pressure above 100 atmospheres gauge, and preferably between 200 and 400 atmospheres gauge, may be used. It is only necessary to work slightly above the $CO_2$ critical temperature. Preferably, the temperature is in the range of from about 40° C. to about 60° C. The contact time between the supercritical $CO_2$ fluid and the cocoa powder may generally comprise from about 2 to about 10 hours, with 4–5 hours being preferred.

Defatted cocoa powder may be prepared by defatting treatment with supercritical $CO_2$. While cocoa powders defatted with solvents other than $CO_2$ may be used, they are less preferred than $CO_2$. The latter is a substance present in ambient air, as well as body tissues and fluids. Hence it is ideal for food processing. Some supercritical fluid solvents, such as hexane, may leave a residue which can trigger an allergic or asthmatic reaction in sensitive patients. The supercritical fluid may comprise any solvent which will not leave a toxic residue.

The benchmark of the requisite degree of processing which is believed sufficient to result in a cocoa powder which is essentially hypoallergenic is a fat content of less than it, preferably less than 0.05%, ideally less than 0.01%, and the essential absence of the birefringent "Maltese cross" appearance of starch granules in the cocoa. The cocoa powder is preferably alkalized prior to defatting. Alkalization enhances the color and flavor of the cocoa powder, and has a fungicidal effect. Methods for alkalizing cocoa powder are known to those skilled in the art.

Foods other than cocoa powder may be molecularly modified in a similar fashion to enhance tolerance by the allergic population, and to reduce fat and calories by treatment with a supercritical fluid solvent, particularly $CO_2$. Foods generally regarded as being particularly allergenic are wheat, eggs, corn, pork, soybean, tomato, orange, seafood, fish, milk protein, spices, condiments and nuts. It is believed that these foods would benefit by supercritical fluid solvent treatment, to reduce allergenicity. The treatment will also reduce fat and calories. For supercritical fluid treatment, these food items are ideally, but not necessarily, first reduced in size. Grains and nuts are ideally, but not essentially, ground into a powder. Meats, fruits and other items should be finely chopped. The contact time between the supercritical fluid and the food item may range from about 2 to about 10 hours, with 4–5 hours being preferred. The temperature and pressure are maintained at the appropriate values to ensure the solvent remains in the supercritical fluid state.

Defatted hypoallergenic cocoa powder may be used in a variety of products in place of conventional cocoa powder, with greatly reduced risk of allergenic complications. Ideally, the other components of the formulation are also hypoallergenic, although for some applications, the hypoallergenic modification may be focused on just one component allergen, e.g., chocolate. Cocoa powder which has been rendered essentially hypoallergenic through supercritical $CO_2$ fluid extraction of fat may be used in the preparation of chocolate-style coatings, i.e., confections. The cocoa powder may be used as a flavoring in soft drinks such as sodas, sports drinks, hypoallergenic dairy drinks, enteral feeding products, fluids to replace mineral loss, and other ingestible liquids.

Where hypoallergenicity is less of a concern, supercritical fluid-treated cocoa powder may be replaced with a reduced fat cocoa powder which is prepared according to conventional techniques by pressing out cocoa butter from chocolate liquor. Chocolate liquor comprises cocoa butter and cocoa powder. When chocolate liquor is heated and placed under pressure, the cocoa butter is squeezed out of the chocolate liquor and separated from the remaining mass of material. The remaining mass is finely ground to produce cocoa powder. As an example of cocoa powder production, see U.S. Pat. No. 4,078,093. The cocoa powder may be combined with fat and optional flavorings, such as salt and/or vanilla flavor, to form a hypoallergenic chocolate-style flavoring composition, as more fully described below.

The dairy component is preferably a dried dairy protein concentrate or hypoallergenic dairy permeate. The dried dairy protein concentrate advantageously comprises a milk protein concentrate or a whey protein concentrate. It less preferably comprises casein, inclusive of the acid and base salts thereof, e.g., sodium caseinate and potassium caseinate. In particular, the dried dairy protein concentrate advantageously comprises a low-lactose content concentrate. Such concentrates comprising only 4% lactose are commercially available. These low-lactose protein concentrates are used in situations where allergenicity is not a concern, but an essentially "sugar-free" (no more than 0.5 wt % sugar from any source) chocolate product is desired. Chocolate compositions, as hereinafter exemplified, which are made from such low-lactose dairy protein concentrates, are characterized by a sugar content of no more than 0.5 wt %. The sugar content comprises lactose.

In lieu of a dairy protein concentrate, a hypoallergenic dairy permeate may be employed as the dairy component. Such products may comprise any hypoallergenic fraction of milk which remains after the removal of all or substantially all of the allergenic protein present in milk. The milk permeate used to produce the chocolate composition of the invention is in the form of a dried powder, due to the anhydrous conditions in chocolate production. Generally, the permeate will comprise a dried milk permeate or a whey permeate, prepared by filtration of milk or whey respectively. While the dairy permeate is preferably derived from cow's milk, goat's milk or -the milk of other mammals may be substituted. It should be noted that while the dairy permeate is rendered hypoallergenic primarily by the removal of allergenic protein through filtration, some trace protein may be tolerated in the permeate provided that subsequent processing sufficiently denatures the protein so as to render it hypoallergenic. The allergenicity of the dairy permeate may be further reduced when combined with chocolate and processing as hereinafter described.

The dairy permeate is prepared by filtration of milk or whey through a filter of sufficient exclusion size so as to filter out the proteins which would otherwise evoke an allergic reaction in sensitive individuals. For the most part, the filter will comprise an ultrafilter or filtration membrane which will prevent the passage of any substance having a molecular weight of more than about 20 kDa, more preferably more than about 10 kDa. Even finer filters may be used in lieu of, or in addition to, a 20 kDa or 10 kDa filter. A finer filter may be used to exclude molecules having a molecular weight greater than about 3.5 kDa, more preferably about 2 kDa, most preferably about 1 kDa.

The preparation of hypoallergenic dairy permeates suitable for use in the practice of the present invention is described in the following U.S. Patents, the entire disclosures of which are incorporated herein by reference: U.S. Pat. Nos. 4,954,361 and 5,064,674. A pressure gradient is preferably applied across the ultrafiltration membrane to facilitate filtration. Preferably, the pressure gradient is adjusted to maintain a filter flux of about 24 liters/$m^2$-hour, which is the typical dairy plant filter flux. The filter is advantageously first primed with a small amount of milk and the permeate is used for other purposes or discarded, prior to beginning filtration. Priming of the filter in this manner is believed to be advantageous to filtering efficiency. Priming is accomplished by discarding the first 15 to 120 minutes of permeate which passes through the filter. This fraction, which is obtained before the filter is operating at peak efficiency may contain protein molecules large enough to be considered allergenic, and therefore should not be utilized.

The pH of the milk during filtration should be within the range of about 2 to about 11.

The temperature of the milk during ultrafiltration should be within the range of about 40° F. to about 150° F. The permeate collected from the ultrafiltration process is essentially free of fat, milk protein, bacteria and bacterial protein. Various man-made chemicals which may be taken up by cows and secreted into milk are also excluded. Such chemicals include the majority of veterinary and agricultural chemicals which may be contained in animal feed or hay. The permeate may be supplemented with hypoallergenic protein, vitamins, minerals and flavoring.

The hypoallergenic protein supplement may comprise hypoallergenic protein per se, such as protein from cereal or vegetable sources. Alternatively, or additionally, it may comprise free amino acids, or polypeptides of animal source, provided the polypeptides are "short chain polypeptides", that is, they are not larger than about 1.5 kDa, preferably not larger than about 1 kDa.

Free amino acids and short chain polypeptides are hypoallergenic regardless of source, and therefore will not contribute to the allergenicity of the product.

The short chain polypeptides may comprise individual polypeptides or a mixture of polypeptides. The short chain polypeptides and amino acids may be obtained by appropriate hydrolysis of any suitable polypeptides or proteins, or may be synthetically produced. Preferably, but not necessarily, they are obtained from milk proteins, so that the supplement permeate maintains a portion of the protein nutritional content of whole milk. Hydrolysates of milk proteins are commercially available or can be specially prepared. See the hydrolysates described in U.S. Pat. Nos. 4,954,361 and 5,064,674. For example, a series of hydrolysates are highly hydrolyzed pancreatic digests of casein. Hydrolyzed pancreatic digest of another milk protein, lactalbumin, are also available. High-performance liquid chromatography indicates that these products are free of polypeptides having a molecular weight of greater than about 1.5 kDa. Hydrolysates of non-milk proteins may also be employed, such as papain digests of soy flour. Food grade preparations of synthetic amino acids may be utilized, such as certain of the NEOCATE family of products from Scientific Hospital Supplies, Gaithersberg, Md.

After the hypoallergenic protein supplement and optional vitamins, minerals and additives to enhance flavor and consistency have been added to the permeate, the supplemental permeate is preferably blended in an emulsifying and diffusing apparatus operating at between about 2,500 and about 3,500 r.p.m., to ensure thorough mixing. The blended product is then homogenized at a pressure ranging from about 2,000 to about 4,000 P.S.I., pasteurized at about 145° F. for about 30 minutes, and then optionally flash sterilized at about 290° F. for about 12 seconds for prolonged shelf-life packaging. The flash sterilization process is known as ultra-high temperature (UHT) pasteurization.

The hypoallergenic dairy permeate may alternatively comprise a dairy permeate as described in my copending patent application filed on Aug. 3, 1993 for "Dairy Permeate-Based Beverage", the entire disclosure of which is incorporated herein by reference. The dairy permeate is obtained upon crude filtration of milk or whey, that is, filtration using a dairy filter or membrane having a molecular weight size exclusion of about 20 kDa or lower. For formation of a whey permeate, the whey is generally diluted at least about 20% with water prior to filtration during the cheese making process. If the whey filtration process is running properly, the permeate will have a protein content of as low as about 0.025%, based upon the weight of the permeate. Inefficient filtration, such as through a worn filter membrane, may increase the protein concentration by an order of magnitude, i.e., to about 0.25 wt. %. The protein concentration may be maintained at 0.025 wt. %, or even as low as 0%, by frequent servicing or replacement of the filter membrane/filter. Moreover, the protein content of the whey permeate can be minimized by selecting a filter/membrane with a smaller size exclusion, e.g. a 10 kDA filter. Generally, the protein content of the whey permeate should not be allowed to exceed about 0.25 wt. %.

It has been unexpectedly observed that a quality control bench mark test can be performed for 99% to complete absence of milk protein in the milk permeate at the dairy ultrafilter site. This can be done in 60 seconds with a dip stick such as the MULTISTIK device of Miles Inc. Diagnostic Division, without the need for elaborate equipment, reagents, technicians and laboratory resources. This rapid dip-stick method is a suitable alternative to more rigorous protein concentration testing methods such as the Kjeldahl test or the Udy test, or methods relying on gel electrophoresis.

A typical filter element useful in generating permeate from whey or milk comprises a polyethersulfone spiral wound membrane (Deaal Ultrafilter ER-3840C) having an average selectivity of 0.01 μ(nominal), a typical operating range of 20–145 psi (600 psi maximum), and a maximum pressure drop per membrane element of 60–65 psi. The usual ideal daily range of pressure is 20 psi back pressure and 80–85 psi feed pressure.

The most common change in milk products resulting from the growth of microorganisms is the development of acid. The action of cheese-making bacteria on the dairy permeate, and whey permeate in particular, may be monitored as a drop in the pH of the permeate. The pH of the dairy permeate, which is typically about 6.2–6.4 (6.3 being the most usual value) immediately after the permeate is collected, will decline to about 6.2, and possibly lower, such as to 5.9, if the cheese-making bacteria remain unchecked. Thus, the dairy permeate should be treated before the pH of the permeate falls off significantly from 6.3. It has been observed that prompt treatment delays the onset of deterioration of the pH, titratable acidity, taste and smell by 3 or more hours at room temperature. Preferably, the permeate is treated to arrest the cheese-making microbes before the pH of the permeate falls more than about 0.3 pH units from the initial pH value at the time of collection. A fall in pH of this magnitude is associated with departure from a fresh milk-like taste. It has been found that a significant increase in microbial growth (about two-fold) will occur about 2 hours following permeate collection, at about room temperature. At about one hour there is no significant change in microbial growth. The least growth is seen at about 15 minutes post collection. Thus, it is preferred that the permeate is treated to arrest microbial growth within about 2 hours of the permeate's collection, more preferably within about 1 hour, most preferably within about 15 minutes. The permeate should be treated even sooner if the dairy plant is not located in a cool climate, or is not air conditioned. Thus, where possible, the permeate is treated immediately upon collection. Where the permeate is refrigerated after collection, the interval may possibly be longer, as refrigeration will retard the action of the cheese-making microbes and preserve the flavor of the whey permeate for some time. If a dry powder is the goal, then immediate drying enhances the efficiency of energy utilized.

The treatment to arrest microbial activity is preferably coupled with permeate production in a continuous process. Accordingly, the permeate is continuously collected. The continuously collected permeate is continuously treated to arrest microbial activity. In this manner, the permeate is treated without the delay which would be attendant to batch processing and production.

The most effective treatment for arresting the action of microbes in the permeate comprises pasteurization. Pasteurization generally comprises partial sterilization at a temperature and for a period of time that destroys objectionable organisms, without major chemical alteration of the product. To arrest the activity of the cheese-making bacteria in the permeate, particularly whey permeate, pasteurization may comprise heating the permeate to a temperature of at least about 110° F., more preferably at least about 120° F., and maintaining that temperature for at least about 30 minutes. According to the so-called "holding method" or "batch pasteurization", the whey permeate may be heated to 145° F. and held at this temperature for 30 minutes with constant stirring with an agitator at 60 rpm. Alternatively, a high-temperature, short-time process ("batch pasteurization"), may be employed. The latter requires a temperature of 162° F. for 16 seconds. Even shorter duration processes (278° F. for 4–6 seconds, or 285° F. for 2 seconds) may be employed, but are not preferred because of the added expense. Any combination of time and temperature may be utilized so long as it achieves adequate pasteurization of the whey permeate to result in the arrest of microbial growth.

Pasteurization should be accompanied by constant mixing to prevent calcium phosphate from precipitating out. Mixing may be carried out by use of an automatic mixer set at a mixing speed of 60 rpm.

The dairy permeate may comprise an acid whey permeate, where a reduction in lactose is desired. Acid whey, the source of acid whey permeate, has a pH of approximately 4.7 and is similar to sweet whey in composition. However, the lactose content is reduced 20% over the lactose content of sweet whey, since up to 20% of the lactose in acid whey is converted to lactic acid by lactose-fermenting bacteria. The reduced pH of 4.7 may also be achieved by addition of food grade acids to replace lactic cultures (directly acidified cottage cheese). The acid whey permeate is batch-pasteurized immediately as produced from an ultrafiltration filter at 145° F. for 30 minutes.

The dairy permeate contains substantial amounts of carbohydrate, in the form of the disaccharide lactose. The enzyme lactase (β-galactosidase) may be added to the permeate to break down lactose, in order to avert problems with consumption by lactose-intolerant individuals. Approximately 15% of the population over the age of six years, and up to 80% or more of non-Caucasian world populations, suffers from lactase deficiency. The amount of lactase added should be sufficient to substantially completely hydrolyze lactose into its component monosaccharides, galactose and glucose. The glucose contributes to the sweetening of the permeate.

The liquid dairy permeate (or cocoa powder/dairy permeate premix) is dried to a powder for use in the practice of the present invention. The liquid permeate may be dried to a moisture content of about 4 wt. % by spray drying employing, for example, a dryer inlet temperature of 400° F. and a dryer outlet temperature of 200° F., a drying time of four to five hours, a pressure of 2000–2500 psi, and a 68–70 gauge spray nozzle bore. Suitable spray dryers are available from, for example, Delfab (Delaware, Ohio). Suitable spray nozzles are available, for example, from Spray Drying Systems (Wheaton, Ill.).

Alternatively, the liquid permeate may be concentrated to about 45 wt. % moisture in a suitable evaporator device, such as the devices available from Weegan (Logan, Utah). In subsequent spray drying to 4% moisture, the spray nozzle gauge should be increased to 60–62 gauge, in order to handle the thicker consistency of the evaporated permeate. Preferably, about 0.25% soy-oat powder is added to the permeate to promote drying. Soy oat powder is not necessary when supercritical $CO_2$— treated cocoa powder is added to the liquid permeate before drying. Drying by a belt-dryer may be substituted for spray drying.

It should be noted that hypoallergenic milk chocolate containing the hypoallergenic dairy permeate from which at least 99% of allergenic milk proteins have been removed, is also essentially free of the majority of veterinary chemicals, since protein comprises the principal binding sites for these chemicals.

The at least partially defatted cocoa powder and dairy permeate may be optionally combined in advance of the other chocolate composition components to form a premix. The cocoa powder may be added to the dairy permeate prior to pasteurization of the permeate, to generate the premix. According to this embodiment, the cocoa powder and dairy permeate are thoroughly mixed and heat treated, as in pasteurization, at a temperature of at least about 145° F. for at least about 2 hours. Alternatively, the cocoa powder can be added just prior to, or during, the drying of the permeate. For example, 25% of the cocoa powder to be used in the chocolate composition may be added to the liquid permeate prior to drying, with the balance being added to the drying permeate. According to another alternative, the cocoa powder may be added to the permeate following completion of permeate pasteurization. Thirty minutes of further heating at the same temperature is sufficient to attain the molecular modification through the Maillard reaction as described more particularly hereinafter. The cocoa powder is advantageously combined with the dairy permeate to form a dairy permeate/cocoa powder premix wherein the weight ratio of the cocoa powder to dairy permeate may vary over a wide range. Preferably, the ratio of cocoa powder to dairy permeate is from about 1:2 to 3:1, more preferably from about 1:2 to about 2:1. A cocoa powder/dairy permeate weight ratio of about 1:1.7 is particularly preferred.

According to an embodiment of the invention utilizing an acid whey permeate as the dairy permeate, a wet blend of permeate solids and supercritical $CO_2$— treated alkalized cocoa powder (e.g., in a 1:1 weight ratio) is diluted to 11 total solids, pH 5.7, and then batch pasteurized for 30 minutes and spray dried in a spray dry oven into a powder. Acid whey permeate is advantageously utilized as the dairy permeate in applications where a reduction in lactose is desired. The lactose content is reduced by approximately 20% by the selection of an acid whey permeate. A further lactose reduction is achieved through the Malliard reaction described below, and through conching of the resulting chocolate composition.

In each of the above embodiments, and the embodiments discussed hereinafter, the dairy permeate may be substituted with a dairy protein concentrate, where milk allergy is not an issue. By selecting a low-lactose concentrate such as a commercially available 4% lactose milk or whey concentrate, an essentially sugar free (i.e., less than 0.5 wt % sugar) chocolate product may be formulated.

The dairy permeate/cocoa powder premix has utility as a precursor of the finished chocolate composition according to the present invention. The premix may advantageously be packaged and distributed in powder form. The dairy permeate/cocoa powder premix is also useful as a hypoallergenic flavoring for beverages and the like. It may be combined with hot water (e.g., 1 teaspoon per cup of water) as an instant cocoa drink.

It has been observed that the defatted cocoa powder and hypoallergenic dairy permeate, upon appropriate priate heat treatment, interact in a manner which provides the resulting hypoallergenic chocolate product with improved properties. Without wishing to be bound by any theory, it is believed that heat processing of the lactose in the dairy permeate causes the lactose molecules to chemically combine with protein in the defatted cocoa powder. The Maillard or "browning" reaction is a condensation reaction known to occur in food products between amino acids or amino acid moieties and sugars, without the aid of enzymes. The reaction rate doubles with each 10° C. increase in temperature above room temperature. Without wishing to be bound by any theory, it is believed that lactose in the dairy permeate combines with protein in the cocoa powder according to the Maillard reaction and other Maillard-like reactions. Since the dairy permeate is, in contrast to whey, whole milk and skim milk, essentially protein-free, there is little or no protein available in the permeate to compete with the cocoa protein for reaction with lactose.

The reaction between the lactose and the cocoa powder protein provides certain advantages. For example, I have found that, upon heat treatment such as normal pasteurization for two hours or more, the otherwise bitter taste of the dairy permeate/cocoa powder premix is considerably softened. The mixture is sweetened by the reaction which occurs upon heat treatment. Without wishing to be bound by any theory, it is believed that this sweetening is attributed to the occurrence of the Maillard reaction. The sweetening of the cocoa powder is advantageous, since commensurably less sweetener may be added to the final chocolate composition. Typical sweeteners have a caloric value of approximately 4 Kcal per gram. The Maillard-sweetened cocoa powder has a caloric value of only about 2-2.5 Kcal per gram. Thus, it may be appreciated that any reduction in the amount of added sweetener in favor of the lower calorie Maillard-sweetened cocoa powder will result in a net reduction of calories in the finished chocolate product. In this manner, the caloric content of the final chocolate composition may be reduced by as much as about 25% below that of conventional chocolate, without the need for including taste-distracting and taste-damaging fillers which might deteriorate upon storage. The sweetening of the cocoa powder through the Maillard reaction with lactose allows the use of larger amounts of cocoa powder in the composition without the accompanying bitter taste of cocoa powder.

Moreover, it is believed that as much as 3–5%, and perhaps as much as 10%, of the Maillard reaction product exists in the form of a molecule having reduced absorbability by the body. This contributes to a further reduction in the caloric content of the final chocolate composition. It has been previously demonstrated that products of the Maillard reaction are not readily absorbed by the body.

It is believed that the Maillard reaction also contributes to reducing the allergenicity of the chocolate product. Lactose bonding with any dairy protein surviving ultrafiltration in the dairy permeate, and lactose bonding with the protein component of the defatted cocoa powder, is believed to contribute to overall reduction of protein allergenicity of the resulting chocolate product. Lactose reduction of up to 70% has been achieved. Without wishing to be bound by any theory, it is believed that the shape of the complex molecules which form according to the Maillard reaction are less recognizable as allergens by the immune system than the corresponding noncomplexed proteins.

It is believed that the Maillard reaction also contributes to increasing the tolerance of migraine sufferers for the present composition. It is known that migraine is to some extent caused by sensitivity to the presence of certain biogenic primary amines in food, such as phenylethylamines. These same amines are available for reaction with sugars such as lactose via the Maillard reaction. The otherwise migraine-inducing amines are thus inactivated by conversion to Maillard reaction products. Furthermore, lactose is reduced up to 70%, which is a benefit to lactose-intolerant individuals.

Combining the defatted cocoa powder with the hypoallergenic dairy permeate either before or during drying of the latter has the further advantage of reducing the permeate drying time. The drying time may be reduced in this manner from an average of four hours to an average of one hour.

The fat component of the chocolate-style compositions may comprise any fat source suitable for human ingestion, which will provide a desirable mouth feel for the chocolate. The fat may be of animal, vegetable or cereal origin. The fat may be a seed fat or a grain fat. In particular, the fat component may comprise a vegetable- or cereal-derived hard butter, most preferably cocoa butter. Cocoa butter results from the defatting of cocoa powder. The fat component may alternatively comprise anhydrous milk fat cleared of any trace of protein by boiling in water, as is described in U.S. Pat. No. 5,112,636, incorporated herein by reference. The butter oil is pipetted off the water and used as the fat component in the chocolate composition. α-Tocopherol (vitamin E), in the amount of about 0.05% by weight, may be added as an antioxidant. In yet another embodiment, the fat may comprise a fat which has stability at room temperature (68°–78° F.), which is necessary for the majority of cocoa butter products. In another embodiment, the fat may comprise a fat which is stable at extremes of temperature such as occurs in global shipment, warehouse storage, or display conditions that lack temperature control to room temperature. A fat system is employed which does not require tempering to enable the cocoa to withstand the melting, solidification and remelting without bloom (i.e., fat separation) normally associated with cocoa butter products. A fat system is employed such that the chocolate reglosses without the need for tempering, that is, it is capable of melting and resolidifying at about 70° F. without loss of its original glossy state.

The caloric content of the fat component, and therefore the caloric content of the finished chocolate composition, may be reduced by blending the fat with a reduced-calorie confectionery fat such as the confectionery fats described in U.S. Pat. No. 4,888,196. One such fat is caprocaprylobehenin, more commonly known as caprenin, which is a triglyceride of capric (C10), caprylic (C8) and behenic (C22) acid. The long-chain behenic component is only partially absorbed by the body. Most of it passes through the gastrointestinal system without contributing calories. Caprenin is a cocoa butter substitute, as the medium-chain capric and caprylic moieties help give caprenin cocoa butter-like melting characteristics. The combination of the free fatty acid moieties forming caprenin yields a caloric density of only 5 Kcal per gram, compared to 9 Kcal per gram for other dietary fats, such as cocoa butter.

While caprenin is recognized as a cocoa butter substitute to replace all or a portion of cocoa butter used in confectionery products, it has limited compatibility with cocoa butter. Thus, it has been recommended that confectionery compositions with caprenin should contain less than 10% cocoa butter. Otherwise, the resulting composition will have an undesirable softness. However, this limitation on the amount of cocoa butter combinable with caprenin may be circumvented by selecting a high-melting cocoa butter fraction. The high-melting butter fraction also has an antibloom effect. The fraction may be prepared according to the method of U.S. Pat. No. 5,112,636. For example, caprenin may be combined with equal parts by weight of a high melting point cocoa butter fraction prepared by heating cocoa butter to a temperature of about 120° F., following by chilling to about 84° F. The chilling temperature is maintained until crystal formation occurs in the cocoa butter. Crystallization can be greatly accelerated by seeding with pre-formed crystals, and/or by adding a high phosphatidylcholine-content lecithin. The liquid, which comprises primarily oleines, is decanted leaving a fraction comprised primarily of stearines. The stearines are characterized by a higher melting point and harder texture than oleines. The stearines can also be harvested by filtration, pressing or centrifugation.

Preparations comprising cocoa butter stearine fractions are commercially available. One such product, "EQUATOR 75" cocoa butter, is available from Loders Croklaan, Lisle, Ill., a division of Van den Bergh Food Ingredients Group. It has a melting point of 360° C. (96.8° F.).

Some commercially available stearine fractions are prepared by solvent extraction of cocoa butter, such as by acetone extraction. It is desirable, however, that the final chocolate powder be completely free of even the most remote trace of solvent such as acetone, particularly when the product is being used by allergic individuals.

The fat component advantageously also includes at least one phospholipid as an emulsifier. While any amount of phospholipid may be included, an amount from about 0.1 to about 0.6 wt %, based upon the total weight of all components of the chocolate composition, is preferred. A most preferred amount is 0.6 wt %. The phospholipid will have viscosity and yield-reducing properties, without interfering with the functionality of the fat and the overall taste and mouthfeel of the finished chocolate product.

The phospholipid may comprise any phospholipid having fat-emulsifying properties. Such phospholipids useful as fat emulsifiers include, for example, phosphatidyl choline, phosphatidyl ethanolamine, phosphatidyl serine, and phosphatidyl inositol. The phospholipids are preferably derived from lecithin, preferably soy lecithin, which is conventionally used in chocolate products. Commercially available concentrated soy lecithin products useful in the practice of the present invention contain 35% or more phosphatidyl choline. The phospholipid may comprise up to 100% phosphatidyl choline.

The presence of the phospholipid emulsifier enhances the functionality of the fat component and thus allows one to utilize less fat in the composition as would otherwise be necessary to maintain an acceptable viscosity, yield structure and mouth feel for the finished chocolate composition. It is believed that incorporation with the phospholipid allows the amount of fat in the inventive composition to be reduced by at least about 4-6% over the 32% concentration of fat present in conventional chocolate compositions.

The chocolate flavor and savoring effect provides for enhanced mouth retention of the taste, and hence enhanced mouth absorption. The phospholipid emulsifier, and phospatidyl choline in particular, also enhances delivery to the oral mucosa, particularly the buccal and sublingual mucosa. While emulsifiers have been used to enhance skin penetration of pharmaceuticals, phosphatidyl choline has not been recognized for its ability to enhance drug absorption via the oral mucosa. The phospholipid further enhances penetration of the chocolate composition's flavor through the taste organs. The cell membranes of the taste buds and other bodies of the oral mucosa contain a phospholipid component which is readily penetrated by a phospholipid carrier.

The inventive chocolate composition may be utilized as a vehicle for delivery of oral medications to mask drug flavor and provide for enhanced drug uptake via the oral mucosa. For example, a dosage form may be prepared by coating a medicament with a chocolate coating according to the present invention, or by mixing the medicament in liquid or powder form with the chocolate composition. A chewable tablet, e.g., aspirin tablet, may be thus formed. The drug may comprise any pharmaceutical suitable for oral delivery, in particular those drugs, such as dihydroergotamine (prescribed for migraine), which are difficult to deliver by the oral route on account of poor absorption. Since the chocolate vehicle is essentially hypoallergenic, it should not promote mucus production or migraine in sensitive individuals. It will thus not aggravate pre-existing health problems in these patients. Further health advantage obtains from the use of a non-sucrose sweetener, and from reduced fat content.

The chocolate composition according to the present invention may be used as a coating for cough drops, or a cough drop may be formed by mixing the active agent with the chocolate and forming the mixture into appropriately sized cough drops. The mixture may further contain natural peppermint, which is a source of natural menthol. The mixture may be blended with a hard candy lozenge. In all of these formulations, the phospholipid advantageously has a high phosphatidyl choline content, preferably from about 35 to about 100% by weight of the phospholipid component. The active agent for a cough drop may comprise, for example, a combination of an antitussive and an expectorant (mucus thinner), such as a mixture of dextromethorphan or salt thereof, and guaifenesin (glyceryl guaiacolate). For example, the active agent may comprise 5 mg dextromethorphan and 50 mg guaifenesin.

A further reduction in the amount of fat is possible if the chocolate mass particles which form in the composition are processed to an increased size. While particles found in conventional chocolates average about 10 microns in size, the particles in the composition of the present invention are processed to an average size in the range of from about 20 to about 30 microns, preferably from about 20 to about 25 microns. A particle size in this range may be achieved by controlling the degree to which the composition is rolled or refined following combination of all the ingredients.

The components of the chocolate composition are combined to form a paste. The desired size is achieved by controlling the amount by which the paste is rolled. While conventional chocolate is typically rolled to a particle size of 10 microns, the present composition is rolled only until the particle size is reduce to 20-25 microns, preferably to about 25 microns. It is believed that by increasing the particle size of the present composition, less fat is required to retain the desired mouth feel and other characteristics of chocolate. Accordingly, maintaining a large particle size permits a fat reduction of about 4% below the fat level of conventional chocolate compositions, while still maintaining the viscosity, yield structure and mouth feel characteristic of conventional chocolate.

It may thus be appreciated that while conventional chocolate contains a fat content of approximately 32%, the foregoing fat-reducing strategy has provided a reduction in fat content in the inventive composition of about 8–10% or more from the typical 32–33% level for chocolate, resulting in an overall fat content for the finished inventive composition of 22–25%, or less.

According to one embodiment of the invention, the fat component for use in the chocolate compositions of the invention may be first prepared as a modular or "structured" fat component which is then combined with the remaining components of the formulation. For example, for low-fat remoldable or non-tempering chocolates, the fat component may advantageously comprise a fat mixture A consisting of 1.4% high phosphatidylcholine-content lecithin, 2.0% clarified anhydrous milk fat stearine fraction containing 0–5% α-tocopherol, and 96.6% fractionated hydrogenated palm kernel oil or KAOPREME. In variations of fat mixture A, the phosphatidylcholine amount may be increased to as high as 10%. Also, clarification of the anhydrous milk fat stearine fraction may be omitted when milk allergy is not an issue. For reduced fat and calorie chocolate product formulations, a fat mixture B may be employed consisting of 1.4% high phosphatidylcholine-content lecithin, 2.0% clarified anhydrous milk fat stearine fraction containing 0.05% α-tocopherol, 48.3% Malaysian cocoa butter stearine fraction, and 48.3% caprenin. According to one variation, fractionated hydrogenated palm kernel oil is substituted for Malaysian cocoa butter stearine fraction. A fat component for low fat chocolate compositions may comprise a fat mixture C consisting of 1.4% high phosphatidylcholine-content lecithin, 2.0% clarified anhydrous milk fat stearine fraction containing 0.05% α-tocopherol, and 95.2% West African cocoa butter. Variants of fat mixture C include mixtures wherein the phosphatidylcholine content ranges up to 10%. The fats are liquified to a temperature of 100°–120° F. and manually mixed with a spatula, or mixed automatically with an in-line mixing device. The remainder of the high phosphatidyl choline lecithin, up to 0.7% of the final chocolate product, is added late in the conching stage.

Additionally, chocolate coatings may be prepared according to the present invention which conform to the standards of identity for authentic chocolate by including at least 10% chocolate liquor. Accordingly, a liquid nitrogen-treated chocolate liquor, conforming to these standards of identity, may be included in the chocolate compositions of the invention. The chocolate composition may comprise from about 0.5 to about 750% liquid nitrogen-treated chocolate liquor, more preferably from about 5 to about 40%, most preferably from about 10 to about 20%. Compositions containing at least 10% chocolate liquor conform to the standards of identity for chocolate. Nitrogen-treated chocolate liquor is commercially available. The use of such chocolate liquors allows the preparation of chocolate compositions having a fat content of only about 24%, while still complying with the standards of identity for chocolate.

According to one preferred embodiment, a standard of identity, reduced fat chocolate composition is prepared by combining supercritical $CO_2$-defatted cocoa powder, a non-fat milk powder, sweetener, cocoa butter, liquid nitrogen-treated chocolate liquor, and a fat mixture H consisting of 16.8% anhydrous milk fat, stearine fraction, 9.0% anhydrous milk fat, 72.2% cocoa butter and 1.3% lecithin.

The various compositions of the present invention preferably contain a sweetener component. Any acceptable sweetener or combination of sweeteners may be used. The sweetener may comprise sucrose or other sugars, or a synthetic sweetener such as saccharin, aspartame, acesulfame-K or other high intensity sweetener. The sweetener may also comprise an anhydrous polyol sweeteners, which is preferred. The polyols are derived from sugars. The hydrogenation process transforms the reactive reducing end of the sugar molecule into a relatively nonreactive hydroxyl group. This is the chemical change that defines the difference between a sugar and a polyol. Polyols which find use as sweeteners according to the present invention include maltitol, mannitol, xylitol, sorbitol, lactitol and combinations thereof. Of these, maltitol is preferred as it has much less laxative effect than the most commonly used sweetener, sorbitol. Also, maltitol lacks the coarse grain of sorbitol. According to one embodiment, sorbitol and maltitol are combined, preferably in approximately equal weight amounts. The need for a sweetener is, however, reduced by virtue of the sweetening effect of the Maillard-sweetened cocoa powder. This is advantageous from the point of view of reducing calories since the Maillard-sweetened cocoa powder has a caloric content of only 2–2.5 Kcal per gram, compared to 4 Kcal per gram for the typical sweetener.

The sweetener component may be selected so as to provide a reduced calorie product. For example, one gram of dextrose may be combined with 40 milligrams of saccharin.

The sweetener may be present in from about a trace amount to up to about 75% of the composition. By "trace amount" means just a few milligrams, or possibly smaller amount of sweetener in, for example, a 5 gram piece of chocolate. Preferably, the chocolate is present in the amount at least about 0.5%.

The chocolate-style composition may further advantageously contain additional ingredients such as vitamins, additional flavorings, flavor enhancers, lecithin and other auxiliary agents suitable for use in confections. Vanilla is particularly useful as a flavor enhancer. The additional ingredients may preferably range up to 5% of the total composition.

For the preparation of hypoallergenic pastel compositions suitable as milk chocolate-style coating, cocoa powder is omitted. Such compositions thus contain from about 0.5 to about 60% fat, from about a trace amount to about 75% sweetener, and from about 10 to about 60% hypoallergenic dairy permeate. Preferably, the sweetener is present in an amount of at least about 0.5%.

The composition may further contain one or more nuts and/or grains suitable for inclusion in chocolate confections. The grains and nuts may advantageously range up to 50% of the total composition. Particularly useful grains are crisp rice and ground oat. Crisp rice is particularly well-tolerated by allergic individuals. Crisp rice provides a hypoallergenic product but with a nut crunch effect. Almond is the most preferred nut, as it has the lowest allergenic potential of all nuts, particularly when defatted. The nuts may be whole or chopped, or substantially ground to flour as in the case of peanut flour. Partially defatted peanut flour (11% fat) is particularly preferred. The partially defatted peanut flour may be more completely defatted by treatment with supercritical $CO_2$. As with supercritical fluid treatment of the cocoa powder, defatting treatment of the peanut flour will enhance its hypoallergenicity.

The hypoallergenic chocolate is formed by combining the ingredients of the composition into a paste, except any grains or nuts. Preferably, the hypoallergenic cocoa powder and dairy permeate are combined prior to pasteurization, or before or during drying of the permeate, as described above. The paste is refined to reduce particle size to 20–30 microns, preferably 20–25 microns, by passage over rollers. The mixture is stirred under heat as in conventional chocolate making processes to form solid chocolate. For the preparation of pastel confection coating compositions, the cocoa powder is omitted. The mixture is then conched by continuous stirring at a temperature of from about 90° to about 200° F., preferably from about 135° to about 160° F., for from about 10 minutes to about 76 hours, preferably from about 12 to about 48 hours. The stirring speed is any stirring speed suitable for chocolate making, such as 1 revolution for 3 seconds. The prolonged conching enhances the flavor and palatability of the composition. The coarse grains or nuts such as whole or chopped grains or nuts are added to the stirred mixture, before solidification of the mixture. Finer grain or nut additives, such as grain or nuts which have been ground to a flour, may be added to the composition prior to refining and conching.

The grains and nuts, particularly the nuts, are preferably partially or completely defatted and then conched by heat treatment as above with the chocolate composition. This will render them hypoallergenic, if the particular grain or nut has allergenic potential. The chocolate composition is then tempered, i.e. chilled, to bring about solidification, according to conventional chocolate-making techniques.

A moldable chocolate may be prepared by selecting a fat which has stability warmer than at room temperature (68°–78° F.) as the fat component. By "stability" is meant that the fat is substantially solid, i.e., greater than 50% is in a solid state. Certain vegetable or cereal fats are stable at room temperature. Moldable chocolate compositions are not tempered. The chocolate may be in the form of discs. The moldable chocolate according to the invention may be easily molded into desired shapes, with a minimum of skill. It may therefore be used by hobbyists and other amateur confectioners. Moldable compositions may be shipped in warm weather without the need for cold packs or refrigerated trucks, since retention of a particular finished shape is not a concern. Alternatively, moldable compositions may be molded prior to warm weather shipment in plastic molds sealed with plastic. Upon arrival, the molded chocolate may be refrigerated for 5 to 10 minutes to restore a solid consistency.

Because the mixture contains only little, if any, allergenic protein from the optional dairy permeate component, the heat processing has the additional advantage in contributing to the denaturation of that remaining protein. Thus, the conching may further improve the hypoallergenicity of the chocolate product. In particular, the residual protein remaining after ultrafiltration comprises lactalbumin predominately. Lactalbumin is the most sensitive of the allergenic proteins to heat denaturation.

The prolonged conching, which contributes to the formation of a complex between the dairy permeated component and the cocoa powder, also serves to reduce the migraine-inducing potential of the inventive chocolate. The heat treatment is likely to cause phenylethylamine, the primary amine which is an important suspect in causing migraine, to combine with reducing sugars in chocolate. In the case of milk chocolate, lactose from the dairy permeate component may combine with the phenylethylamine to form a migraine-inactive complex. The heat treatment also very likely converts phenolic compounds and catechin in the chocolate to an amorphous insoluble polymerized mass. In this state, these compounds are inactive in triggering migraine. The prolonged heat treatment may possibly also serve to sublimate theobromine and thereby reduce its concentration. Theobromine is a suspected migraine-inducing compound found in cocoa, although it is probably much less of a migraine-inducing agent than phenylethylamine.

Furthermore, the substitution of other sweeteners for sucrose, the natural sweetener ordinarily present in conventional chocolate, serves also to reduce the potential for migraine. Ingestion of concentrated sucrose after fasting has been observed to cause migraine in susceptible individuals.

The resulting chocolate or chocolate-style compositions are essentially hypoallergenic since the protein-containing components have been rendered hypoallergenic by processing or protein removal. The product is well tolerated by allergic patients.

The defatted, hypoallergenic cocoa powder may also be used as a flavoring for beverages. In particular, it may be used to flavor sports drinks, electrolyte replacement beverages, medicinal feedings such as enteral feeding compositions, and other beverages. In particular, the defatted, hypoallergenic cocoa powder may be used to improve the taste of elemental enteral feeding compositions, such as feeding compositions comprising a mixture of amino acids, and soy bean beverages. The cocoa powder may be combined with dairy permeate to form a flavoring for beverages, as described elsewhere herein.

The defatted, hypoallergenic cocoa powder may be combined with a sugar or sugar substitute and/or an appropriate oil, e.g., soy oil, to form a soy beverage. Other oils having hypoallergenic characteristics, e.g., rice bran oil or palm kernel oil, may be substituted.

The practice of the invention is illustrated by the following non-limiting examples. In certain of the examples, a sufficient amount of fat is added with the other components to provide a creamy mixture having a particle size in the range of 20 to 25 microns, and a pasty consistency which when further refined by passage over rollers will provide a creamy consistency. The remainder of the fat content is added upon conching.

According to one preferred embodiment of the invention, the total fat content of the composition is not more than about 29% by weight, more preferably not more than about 25%, most preferably in the range of 20–24%. A fat content of 24% is particularly preferred. A total fat content of 29% is less than the typical chocolate fat content of 33%. The products having a fat content of only 24% to 25% have only ¾ the fat content of conventional chocolate, without disturbing the taste. Notwithstanding this significant fat reduction, the chocolate compositions of the present invention maintain the mouth feel of conventional chocolate.

Milk is 12% solids, of which approximately one third is protein, one third is fat, and one third is lactose and minerals. The dairy permeate used in the practice of the present invention has the natural fat content removed. In the following examples, the dried dairy permeate is combined with fat such that the fat load in the permeate powder is zero, or merely about 3–5% when reconstituted with hypoallergenic milk fat. According to one embodiment, a fat content of as low as 3% was obtained. Notwithstanding this reduction in fat content from the 33% fat content of conventional milk solids, the inventive milk chocolate or chocolate-style compositions maintain the desirable mouth feel of conventional milk chocolate.

In addition to a sharply reduced fat content, the compositions according to the present invention are characterized by a substantially reduced caloric content in comparison to conventional chocolate products. The products of the invention are characterized by caloric contents per 100 grams of less than 500 Kcal, in some cases less than 450 Kcal, in other cases less than 400 Kcal, and in some cases even as low as 350 Kcal or less.

The products of the present invention, due to their reduced fat and calorie content, are appropriate not just for chocolate-allergic individuals, but for all those who seek to enjoy the good taste of chocolate while maintaining a diet of reduced fat and reduced calories.

The products of each of the non-prophetic examples were ingested by a milk- and chocolate-allergic female patient, without any intolerance. The patient, who manifests migraine headache and gastrointestinal bleeding upon ingestion of even small amounts of chocolate, was observed to tolerate all products sampled. The patient is the most reactive of more than 100 chocolate-sensitive patients under clinical surveillance. Her gastrointestinal bleeding occurs within 12–24 hours of ingestion of commercial chocolate. Migraine occurs within 12–24 hours when challenged with chocolate. The symptoms have been noted to occur in this patient on more than 30 occasions.

EXAMPLE I

Five grams of supercritical $CO_2$-treated cocoa powder was alkalized and mixed with a 6-ounce vanilla-flavored soda containing citric acid. On stirring, the release of $CO_2$ generated from the reaction of $K_2CO_3$ with the citric acid in the soda led to the dispersion of the cocoa powder. The drink may thus serve as an instant "soda fountain" chocolate soda. Prepared with a sugar substitute such as aspartame or saccharin, the beverage may serve as a low-calorie diet soda, which is 99.99% fat-free. The beverage was well tolerated by the female allergic patient.

EXAMPLE Ia

Five grams of supercritical $CO_2$-treated cocoa powder was alkalized and mixed with 6 ounces of hot water and sweetened with 1 gram of dextrose and 40 mg of saccharin. The beverage was served as a reduced-calorie, hypoallergenic hot chocolate, which was in excess of 99% fat free. The beverage was well tolerated by the female allergic patient.

EXAMPLE II

Alkalized cocoa powder is prepared by heating ground nibs of roasted cocoa beans at temperatures of 215°–300° F. and pressures of 6,000–8,000 psi for 30 min. The powder is treated with supercritical $CO_2$, resulting in at least 99.5% fat-free cocoa. A hypoallergenic chocolate composition is prepared by mixing 7.0% wt % of the defatted cocoa powder, sufficient cocoa butter to obtain a creamy consistency, 63.0 wt % sucrose, 0.4% lecithin and 0.1% natural vanilla. The mixture is then refined to a 25 micron particle size and then conched by heating for two hours at 145°–180° F., while additional cocoa butter is added to bring the cocoa butter total weight up to 29.5%. The mixture is then cooled. Chocolate bars are prepared from the composition.

EXAMPLE III

Chocolate according to Example II is prepared, except that maltitol is substituted for sucrose to form a sugar-free chocolate composition.

EXAMPLE IV

A hypoallergenic milk chocolate is prepared by combining 11% dry weight of a hypoallergenic milk prepared by ultrafiltration of casein-free sweet whey according to Example 16 of U.S. Pat. No. 5,064,674, 7% hypoallergenic defatted cocoa powder, 43% sucrose, 38.5% cocoa butter, 0.4% lecithin, and 0.1% natural vanilla.

EXAMPLE V

Chocolate according to Example IV is prepared, except that maltitol is substituted for sucrose to form a sugar-free chocolate composition.

EXAMPLE VI

A hypoallergenic milk chocolate was prepared by combining 20% dry weight of a hypoallergenic milk prepared by ultrafiltration of casein-free sweet whey according to Example 16 of U.S. Pat. No. 5,064,674, 8% hypoallergenic supercritical $CO_2$-defatted cocoa power (99.99% fat free), 38.5k sucrose, 27% cocoa butter, 6% hypoallergenic butter fat prepared in accordance with U.S. Pat. No. 5,064,674 (plus 0.05% α-tocopherol), 0.4% lecithin, and 0.1% natural vanilla. The mixture was conched 48 hours, tempered and molded into small bars. The bars were well tolerated by a chocolate and milk allergic individual.

EXAMPLE VII

Hypoallergenic butter fat was prepared by triple washing of anhydrous milk fat (99.99% pure, 0.01% moisture) in boiling distilled water (5 L boiling water per 20 grams milk fat). To the washed, now hypoallergenic butterfat was added 500 ppm (i.e., 0.05%) of a-tocopherol (vitamin E). Whey diluted 20% with spring water during the cheese making process was filtered through a tubular spiral wound membrane ultrafilter (0.01 µ pore size). The permeate (pH 6.6) was immediately batch pasteurized at 145° F. for 30 minutes, followed by refrigeration. The permeate was dried into a powder (4% moisture) by spray drying in a spray drying oven.

Three-ounce chocolate bars were prepared by mixing the following ingredients in the following weight percentages:

| | |
|---|---|
| Supercritical $CO_2$-defatted cocoa powder (99.95% fat free) | 7.0 |
| Hypoallergenic whey permeate powder | 21.5 |
| Hypoallergenic butterfat (containing 0.05% vitamin E) | 3.5 |
| Lecithin | 0.3 |
| Natural vanilla | 0.1 |
| Cocoa butter | 26.5 |
| Maltitol | 41.1 |

The ingredients were mixed thoroughly, conched by heating for 36 hours at 145°–155° F., at a stirring speed of one revolution per 10 seconds. The composition was then tempered and formed into 5 gram squares which had the taste and appearance of milk chocolate. The milk chocolate was well tolerated by a chocolate and milk allergic patient.

EXAMPLE VIII

Example VII was repeated with the following ingredients in the following weight percentages:

| | |
|---|---|
| Supercritical CO$_2$-defatted cocoa powder (99.99% fat free) | 7.0 |
| Hypoall. whey permeate powder | 11.4 |
| Hypoallergenic butterfat (containing 0.05% vitamin E) | 0.6 |
| Lecithin | 0.4 |
| Natural vanilla | 0.1 |
| Cocoa butter | 28.4 |
| Maltitol | 52.1 |

The ingredients were mixed thoroughly and conched by heat for 36 hours at 145°–155° F., at a stirring speed of one revolution per 10 seconds. Crisp rice was then added to a total rice loading of 4 wt. % The composition was then tempered and formed into 5 gram squares which had the taste and appearance of milk chocolate. The squares were well tolerated by a chocolate and milk allergic individual.

EXAMPLE VIIIa

Example VIII was repeated, with the addition of 5% partially defatted peanut flour. Maltitol was adjusted to 47.1%. The mixture was conched for 28 hours. The 5 gram squares were well tolerated by a chocolate and milk allergic individual.

EXAMPLE IX

Example VII was repeated with the following ingredients in the following weight percentages:

| | |
|---|---|
| Supercritical CO$_2$-defatted cocoa powder (99.99% fat free) | 7.0 |
| Hypoall. whey permeate powder | 20.0 |
| Hypoallergenic butterfat (containing 0.05% vit. E) | 0.6 |
| Lecithin | 0.4 |
| Natural vanilla | 0.1 |
| Cocoa butter | 28.4 |
| Maltitol | 39.5 |
| Partially defatted peanut flour | 4.0 |

The ingredients were mixed thoroughly and heated for 36 hours at 145°° F., at a stirring speed of one revolution per 10 seconds. Crisp rice was then added to a total rice loading of 4 wt. % The composition was then tempered and formed into 5 gram squares which had the taste and appearance of milk chocolate. The squares were as well tolerated by the chocolate and milk allergic individual, and had the good taste and appearance of milk chocolate.

EXAMPLE X

Example VII was repeated with the following ingredients in the following weight percentages:

| | |
|---|---|
| Supercritical CO$_2$-defatted cocoa powder (99.99% fat free) | 7.0 |
| Hypoall. whey permeate powder (containing 0.05% vit. E) | 24.0 |
| Hypoallergenic butterfat | 1.2 |
| Lecithin | 0.4 |
| Natural vanilla | 0.1 |
| Cocoa butter | 28.4 |
| Maltitol | 38.9 |

The ingredients were mixed thoroughly and conched by heating for 36 hours at 145°–155° F., at a stirring speed of one revolution per 10 seconds. Crisp rice was then added to a total rice loading of 4 wt. % The composition was then tempered and formed into 4 gram squares which had the taste and appearance of milk chocolate. The squares were well tolerated by the allergic patient.

EXAMPLE XI

A hypoallergenic pastel confection coating ("white chocolate") is prepared according to Example VIII except that the cocoa powder was omitted, and the amount of maltitol is increased to 59.1%.

EXAMPLE XII

A hypoallergenic confection is prepared according to Example VIII except that the cocoa and whey permeate powder are omitted, and the amount of maltitol is increased to 70.5%.

EXAMPLE XIII

A moldable hypoallergenic chocolate, not requiring tempering or retempering after melting, was prepared by mixing the following ingredients, followed by heating for 36 hours at 145° F., at a stirring speed of one revolution per 10 seconds.

| | |
|---|---|
| Supercritical CO$_2$-defatted cocoa powder | 7.0 |
| Hypoall. whey permeate powder (containing 0.05% vit. E) | 11.4 |
| Hypoallergenic butter fat | 0.6 |
| Lecithin | 0.4 |
| Natural vanilla | 0.1 |
| Maltitol | 48.1 |
| Thermally stable hydrogenated palm kernel oil | 28.4 |

The resulting chocolate was prepared as multiple wafer discs, melted in a double boiler for 5 minutes at 130° F. and then poured into a mold and allowed to cool in a refrigerator for 5–10 minutes. The molded squares were tolerated by a chocolate and milk allergic individual, and had the good taste and appearance of milk chocolate.

EXAMPLE XIIIa

A sugar-free moldable chocolate, hypoallergenic as to its cocoa component but not its dairy component, is prepared by substituting a commercially available dairy protein concentrate (milk protein concentrate, 4% lactose; whey permeate concentrate, 4% lactose; or sodium or potassium caseinate) for the hypoallergenic whey permeate powder of Example XIII. The composition is characterized by a reduced lactose content, to provide an essentially "sugar free" (i.e., no more than 0.5 wt % sugar) chocolate product.

EXAMPLE XIV

A hypoallergenic cocoa-flavored powder useful for flavoring beverages was prepared as follows. The following ingredients were combined and formed with warming into a paste:

| | |
|---|---|
| Cocoa butter | 15 grams |
| Supercritical CO$_2$-defatted cocoa powder | 135 grams |
| Refined soybean oil | 150 grams |
| Sucrose | 700 grams |

-continued

| | |
|---|---|
| Lecithin | 4 grams |
| Natural vanilla | 1 gram |

The paste was refined over refining rolls pressurized to a 350–450 Psi squeeze pressure to form a powdery ground matrix useful as a powdered chocolate flavoring.

EXAMPLE XIVa

Two to three teaspoons of the powder prepared according to Example XIV are added with stirring to six to eight ounce glasses containing soybean beverage (commercially available milk substitute) to form a chocolate-flavored hypoallergenic beverage.

EXAMPLE XIVb

Example XIV was repeated except 700 grams of maltitol was substituted for sucrose to make a sugar-free hypoallergenic cocoa-flavored powder for use in flavoring the beverage.

EXAMPLE XV

The following ingredients are combined and mixed well to form a hypoallergenic chocolate syrup:

| | | |
|---|---|---|
| Supercritical $CO_2$-defatted cocoa powder | 178 | grams |
| Cocoa butter | 22 | grams |
| Fructose | 250 | grams |
| Sucrose | 350 | grams |
| Water | 250 | grams |
| Natural vanilla | 2.5 | grams |
| Potassium sorbitate | 1.0 | grams |
| Sodium chloride | 0.5 | grams |
| Carrageenan | 0.5 | grams |

EXAMPLE XVI

A hypoallergenic powdered chocolate flavoring is prepared as in Example XIV, except that a mixture of maltitol and xylitol is substituted for the sucrose.

EXAMPLE XVII

A hypoallergenic powdered chocolate flavoring is prepared as in Example XIV, except that 110 grams of sucrose is substituted with 110 grams of a dried powder of a hypoallergenic whey permeate, such as the whey permeate powder prepared according to Example 16 of U.S. Pat. No. 5,064,674.

EXAMPLE XVIIa

Example XVIII is repeated increasing the amount of milk permeate powder to 200 grams.

EXAMPLE XVIII

A moldable hypoallergenic chocolate not requiring tempering or retempering was prepared and molded according to Example XIII and poured into plastic trays accommodating 28 one inch squares of chocolate. After chilling in the refrigerator for ten minutes, the trays were covered with plastic, sealed and shipped from Florida to Pennsylvania via ordinary mail in 90° F. weather, without a cold pack or refrigeration. Upon arrival 3 days later the chocolate was found to be in molded form, with its chocolate sheen intact. Its appearance and taste were good, unlike conventional chocolate which being sent under similar conditions would have arrived soft, melted and unformed. Conventional chocolate would have arrived with a white discoloration indicative of bloom, i.e., fat separation. The chocolate was tolerated by the chocolate and milk allergic subject.

EXAMPLE XIX 883 lbs of liquid hypoallergenic whey permeate (corresponding to about 100 lbs of hypoallergenic whey permeate powder, based upon a 12% solids determination by refractometry of the liquid) was placed in a container immediately upon collection. To this was added 60 lbs of supercritical $CO_2$-defatted cocoa powder (99.99% fat free). The pH of the permeate was observed to increase from 6.2 to 6.6 upon addition of the cocoa powder. The mixture was batch-pasteurized at 145° F. for 2.5 hrs. The mixture was sampled periodically for taste. A change in flavor was noted after the first hour. The mixture became progressively sweeter in taste. After two hours, the bitter taste characteristic of cocoa was absent. The mixture was subsequently dried into a powder by drying in a spray drying oven. Whereas complete drying (to 4% moisture) of whey permeate alone requires four hours, the whey permeate/cocoa powder mixture was dried in only one hour.

EXAMPLE XIXa

Example XIX was repeated except that the whey permeate was batch pasteurized at 145° F. for 30 minutes before addition of cocoa powder and then for another 30 minutes after addition of the cocoa powder.

EXAMPLE XIXb

Example XIXa was repeated, except that the ratio of whey permeate (based upon dry weight) to cocoa powder was decreased from about 5:3 to about 1:1. The pH of the permeate increased from 6.2 to 7.0.

EXAMPLE XIXc

Example XIXa was repeated, except that the ratio of whey permeate (based upon dry weight) to cocoa powder was decreased from about 5:3 to about 18:25. The pH of the permeate increased to pH 7.2.

The Example XIXa, XIXb and XIXc products displayed an increased sweetness over the flavor of the separate cocoa component. On a subjective scale,the Example XIXa and XIXb products were approximately four times sweeter than the cocoa powder alone, while the XIXc product was only two times sweeter. Drying time was also accelerated fourfold, as in Example XIX (from four hours to one hour).

EXAMPLE XX

A hypoallergenic chocolate having a fat content of 25% and caloric content of 457.9 Kcal per 100 grams was prepared by mixing the ingredients listed below in the indicated weight percentages. The lecithin comprised soy bean lecithin containing 35% phosphatidyl choline. The hypoallergenic butter fat and deodorized Malaysian cocoa butter constitute stearine fractions were prepared by separately heating hypoallergenic butter fat or deodorized Malaysian cocoa butter to a temperature of about 120° F., followed by chilling to about 84° F. The chilling temperature was maintained until crystal formation occurs. The resulting liquid was poured off, leaving a high melting point fraction comprised primarily of stearines ("stearine fraction"). The ingredients of the chocolate composition were mixed thoroughly into a paste. The paste was refined to a particle size of 25 microns by passage over rollers. The paste was conched by heating for 36 hours at 145°–155° F., at a stirring speed of one revolution per 10 seconds. The composition was then tempered and formed into about 5 gram chocolate squares.

| | Wt % | Kcal/g | Kcal/100 g of chocolate |
|---|---|---|---|
| Supercritical $CO_2$-defatted cocoa powder (99.99% fat free) | 7.0 | 1.6 | 11.20 |
| Hypoall. whey permeate | 11.4 | 4.0 | 45.60 |
| Hypoall. butter fat (stearine fraction) | 0.6 | 9.0 | 5.40 |
| Soy lecithin (35% phosphatiayl choline) | 0.5 | 7.0 | 3.50 |
| Natural vanilla | 0.1 | 4.0 | 0.40 |
| Deodorized Malaysian cocoa butter (stearine fraction) | 12.2 | 9.0 | 109.8 |
| Caprenin | 12.2 | 5.0 | 61.0 |
| Maltitol | 56.0 | 4.0 | 224.0 |
| Total: | 100.00 | | 460.9 |

EXAMPLE XXa

Example XX is repeated except as follows. The hypoallergenic whey permeate is substituted with an identical amount of milk or whey protein concentrate (containing 4% lactose), calcium caseinate or sodium caseinate. This sharply limits the presence of any sugar, e.g., lactose, which may be otherwise supplied through the hypoallergenic whey permeate. If a 60% whey protein concentrate (40% lactose containing mineral salts) is employed, allergenicity may be reduced by first batch pasteurizing a pre-mixture of the 6% whey protein concentrate in liquid form and cocoa powder for 30 minutes, followed by spray drying.

EXAMPLE XXI

A hypoallergenic dark chocolate formulation useful as a coating and having a 28% fat content was prepared as a 300 lb factory run by mixing the following ingredients into a paste, followed by conching, stirring and tempering as in the previous example:

| | Wt % | Kcal/g | Kcal/100 g of chocolate |
|---|---|---|---|
| Supercritical $CO_2$-defatted cocoa powder (99.99% fat free) | 21.2 | 1.6 | 33.6 |
| Lecithin | 0.4 | 7.0 | 2.8 |
| Natural vanilla | 0.1 | 4.0 | 0.4 |
| Cocoa butter | 28.0 | 9.0 | 252.0 |
| Maltitol | 50.3 | 4.0 | 201.2 |
| Total: | 100 | 4.0 | 490.0 |

The formulation was tolerated by a chocolate-allergic patient without gastrointestinal bleeding and migraine usually noted upon consumption of commercial chocolate by this individual. The composition may be used as a coating to enrobe a variety of products such as confections, grain mixtures, frozen hypoallergenic dairy products such as hypoallergenic ice cream (upon changing the fat to a hypoallergenic oil, e.g., rice oil), and pharmaceutical dosage forms.

EXAMPLE XXII

A milk chocolate formulation having a 240% fat content, useful as a coating, is prepared in a 3,000–6,000 lb batch according to the procedure of the previous example, from the following ingredients:

| | Wt % | Kcal/g | Kcal/100 g of chocolate |
|---|---|---|---|
| Supercritical $CO_2$-defatted cocoa powder (99.99% fat free) | 7.0 | 1.6 | 11.20 |
| Hypoall. whey permeate | 11.4 | 4.0 | 45.60 |
| Hypoall. butter fat | 0.6 | 9.0 | 5.40 |
| Soy Lecithin | 0.6 | 7.0 | 4.20 |
| Natural vanilla | 0.1 | 4.0 | 0.40 |
| Cocoa Butter | 23.4 | 9.0 | 210.6 |
| Maltitol | 56.9 | 4.0 | 224.0 |
| Total | 100 | | 498.2 |

EXAMPLE XXIIa

Example XXII is repeated, with the same modifications as in Examples XXa.

EXAMPLE XXIIb

Example XXII is repeated except that the fats (butter fat, lecithin and cocoa butter) are first combined into a fat component mixture, which is then added to the remaining ingredients. The fat component is formed by melting the individual fats by heating to a temperature in the range of 100°–120° F. The melted fats are mixed manually with a spatula, or are mixed automatically with an in-line mixing device.

EXAMPLE XXIII

A hypoallergenic milk chocolate having a 24% fat content is prepared according to the procedure of Example XXI. The whey permeate is batch pasteurized for 30 minutes, and then batch pasteurized again for another 30 minutes after addition of cocoa powder.

| | Wt % | Kcal/g | Kcal/100 g of chocolate |
|---|---|---|---|
| Supercritical $CO_2$-defatted cocoa powder (99.99% fat free) | 30.5 | 1.6 | 48.8 |
| Hypoall. whey permeate | 18.0 | 4.0 | 72.0 |
| Hypoall. butterfat (stearine fraction) | 0.6 | 4.0 | 2.40 |
| Soy Lecithin (35% phosphatidyl choline) | 0.6 | 7.0 | 4.20 |
| Natural vanilla | 0.1 | 4.0 | 0.40 |
| Deodorized Malaysian cocoa butter (stearine fraction) | 23.4 | 9.0 | 210.68 |
| Maltitol | 26.7 | 4.0 | 106.8 |
| Total: | 100.0 | | 445.3 |

EXAMPLE XXIIIa

Example XXIII is repeated except that the fats (butter fat, lecithin and cocoa butter) are first combined into a fat component mixture, which is then added to the remaining ingredient.

EXAMPLE XXIV

A 24% fat content hypoallergenic dark chocolate formulation is prepared according to the procedure of Example XXI from the following ingredients in the following amounts:

|  | Wt % | Kcal/g | Kcal/100 g of chocolate |
|---|---|---|---|
| Supercritical $CO_2$-defatted cocoa powder (99.99% fat free) | 21.0 | 1.6 | 33.6 |
| Hypoall. butter fat | 0.6 | 4.0 | 2.40 |
| Soy lecithin (35% phosphatidyl choline) | 0.6 | 7.0 | 4.20 |
| Natural vanilla | 0.1 | 4.0 | 0.40 |
| Coca butter | 23.4 | 9.0 | 210.6 |
| Maltitol | 54.3 | 4.0 | 168.0 |
| Total: | 100 |  | 419.01 |

EXAMPLE XXIVa

Example XXIV is repeated except that the fats (butter fat, lecithin and cocoa butter) are first combined into a fat component mixture, which is then added to the remaining ingredient.

EXAMPLE XXV

A 24% fat content hypoallergenic milk chocolate is prepared according to the procedure of Example XX from the following ingredients in the following amounts:

|  | Wt % | Kcal/g | Kcal/100 g of chocolate |
|---|---|---|---|
| Supercritical $CO_2$-defatted cocoa powder (99.99% fat free) | 31.5 | 1.6 | 49.6 |
| Hypoall. whey permeate | 18.0 | 4.0 |  |
| Hypoall. butter fat (stearine fraction) | 0.6 | 9.0 | 5.0 |
| Soy Lecithin (35% phosphatiayl choline) | 0.6 | 7.0 | 4.20 |
| Natural vanilla | 0.1 | 4.0 | 0.40 |
| Deodorized Malaysian cocoa butter (stearine fraction) | 11.7 | 9.0 | 105.34 |
| Caprenin | 11.7 | 5.0 | 58.5 |
| Maltitol | 26.0 | 4.0 | 104.0 |
| Total: | 100.00 |  | 399.4 |

EXAMPLE XXVI

A hypoallergenic chocolate-coated ice cream was prepared as follows. The following ingredients were mixed thoroughly together and pasteurized at 180° F. for 5 minutes, and then homogenized in a high-speed milk homogenizer:

| Hypoall. whey permeate powder | 120 g |
|---|---|
| Hypoall. butterfat (containing 0.05% alpha tocopherol) | 140 g |
| Maltitol | 251 g |
| Gelatin (250 bloom strength) | 6 g |
| Vanilla extract (2-fold concentrate) | 3 g |
| Distilled water | 480 g |

The homogenized mixture was allowed to age under refrigeration for 24 hours, molded into approximately 1½×1½×1 inch squares, and then frozen. The frozen squares were then demolded and coated with a mixture comprising 90% hypoallergenic dark chocolate coating prepared according to Example XXI and 10% rice bran oil. The coating procedure consisted of enrobing the chocolate squares with the coating mixture at 80°–82° F. for 5–10 seconds, followed by freezing the coated squares in a metal tray.

The ice cream preparation of the previous example may optionally include a step of whipping the homogenized mixture during freezing to the desired volume increase or overrun.

The 10% rice oil/90% hypoallergenic dark chocolate coating of the Example XXVI chocolate-coated ice cream product contrasts with conventional chocolate-coated ice cream products which typically contain a coating of 70–75% conventional chocolate, the balance comprising coconut oil. Both conventional chocolate and coconut oil are a source of allergens.

EXAMPLE XXVIa

A homogenized mixture was prepared as in Example XXVI. The mixture was then whipped during freezing to form a "Schlag" (whipped butter).

EXAMPLE XXVII

High phosphatidylcholine lecithin, sugar-free, chocolate-flavored aspirin was prepared as follows. Dark chocolate was prepared according to Example XXI, except that the lecithin utilized comprised a high phosphatidyl choline content lecithin (35–100% phosphatidyl choline). The chocolate was mixed into a paste, passed through steel rollers for refining to a 25 micron particle size, and then remelted. The chocolate was formed into 750 mg units. Eighty-one mg of powdered acetylsalicylic acid was inserted into each unit. The chocolate-flavored aspirin may be utilized as a pleasant tasting, high mucosal penetrating and oral absorbable delivery system which is maintained sublingually in the mouth until completely dissolved. The product will not promote tooth decay, since it is sugar-free.

EXAMPLE XXVIIa, XXVIIb and XXVIIc

Example XXVII is repeated, but substituting for the 81 mg of acetylsalicylic acid: 10 mg hydroxyzine, to serve as an antihistamine/antimigraine medication; 5 mg dextromethorphan, as a cough suppressant remedy; 5 mg dextromethorphan and 50 mg glyceryl guaiacolate or potassium guiacosulfate, as a cough suppressant mucuous thinner expectorant tablet.

EXAMPLE XXVIII

A chocolate-flavored elemental feeding was prepared as follows. One teaspoon of the powder according to Example XIV and two tablespoons of a synthetic amino acid nutrient powder mixture containing glucose (NEOCATE+E028, Scientific Hospital Supplies, Gaithersberg, Md.) were added to 6–8 ounces of distilled water and stirred well. The beverage was tolerated by the chocolate allergic patient without reaction.

EXAMPLE XXIX

The procedure of Example XXVI was repeated, except that the hypoallergenic whey permeate powder was replaced by 120 grams of finely ground, finely meshed, concentrated rice protein.

EXAMPLE XXX

A hypoallergenic beverage was prepared as follows. The following ingredients were combined to form a 1000 gram mixture as a chocolate-flavored, sugarless powder:

| | |
|---|---|
| Cocoa butter | 15 grams |
| Supercritical CO$_2$-defatted cocoa powder | 135 grams |
| Refined soybean oil | 150 grams |
| Maltitol | (q.s) 1000 grams |
| Lecithin | 4 grams |
| Natural vanilla | 1 gram |

The lecithin and vanilla were the last ingredients to be added to the mixture. The mixture was refined over refining rolls to a powdery ground matrix useful as a powdered chocolate flavoring. Two to three teaspoons of this powder were added with stirring to six to eight ounce glasses containing a soybean beverage. Soybean beverages are commercially available as milk substitutes. In lieu of soybean beverage, other milk substitutes may be used, e.g., liquid formulations of amino acids or short-chain polypeptides, such as those formulations which have utility as enteral or elemental feeding preparations.

EXAMPLE XXXI

A sugar-free, moldable chocolate not requiring tempering or retempering, hypoallergenic as to its cocoa component but not its dairy component, is prepared as follows: A commercially available dairy protein concentrate (milk protein concentrate, 4% lactose; whey protein concentrate 60%, 40% lactose and mineral salts; or sodium or potassium caseinate) is combined with supercritical CO$_2$-treated cocoa powder, on the basis of 11.4 parts dairy protein concentration to 7 parts cocoa powder, based upon dry weight. The mixture is pasteurized for 30 minutes, followed by spray drying in a spray drying oven. The following ingredients are mixed, followed by conching for 36 hours at 145° F., at a stirring speed of up to 2–3 revolutions per second.

| | |
|---|---|
| Pasteurized, dried CO$_2$-defatted cocoa powder/dairy protein concentrate | 18.4 |
| Anhydrous milk fat stearine fraction | 0.6 |
| Lecithin | 0.4 |
| Natural vanilla | 0.1 |
| Maltitol | 48.1 |
| Thermally stable hydrogenated palm kernel oil | 28.4 |

The resulting chocolate is prepared as multiple wafer discs, melted in a double boiler for 5 minutes at 130° F. and then poured into a mold and allowed to cool in a refrigerator for 5–10 minutes.

EXAMPLE XXXII

A sugar-free, moldable hypoallergenic chocolate not requiring tempering or retempering is prepared as follows. A fat mixture (hereinafter "fat mixture A") is prepared by combining 1.4% high phosphatidylchlonine content lecithin, 2.0% clarified anhydrous milk fat stearine fraction containing 0.05% α-tocopherol and 96.6% fractionated hydrogenated palm kernel oil (Satina N.T.). The fat mixture is combined with other ingredients as follows, then followed by conching for 36 hours at 145° F., at a stirring speed of up to 2–3 rps. The additional 0.4 phosphatidyl choline apart from fat mixture A is added to the mixture late in the conching stage.

| | |
|---|---|
| Supercritical CO$_2$-defatted cocoa powder | 7.0 |
| Hypoallergenic whey permeate powder | 11.4 |
| Natural vanilla | 0.1 |
| Maltitol | 57.1 |
| Fat mixture A | 24.0 |
| High phosphatidyl choline lecithin | 0.4 |

EXAMPLE XXXIII

A sugar-free, moldable chocolate, hypoallergenic as to its cocoa component but not as to its dairy component, is prepared by repeating Example XXXI, but substituting the individual milk fat, lecithin and palm kernel oil ingredients with the identical amount of fat mixture A, except that anhydrous milk fat stearine fraction of fat mixture A is not clarified.

EXAMPLE XXXIV

A reduced-fat, reduced-calorie composition is prepared by repeating the procedure of Example XXXII, substituting fat mixture A with an identical amount of the following fat mixture B:

Fat mixture B:

| | |
|---|---|
| High-phosphatidylcholine lecithin | 1.4 |
| Anhydrous milk fat stearine fraction (containing 0.05 α-tocopherol) | 2.0 |
| Satina N.T. | 47.8 |
| Caprenin | 47.8 |

EXAMPLE XXXV

A reduced fat and calorie chocolate composition is prepared by repeating the procedure of Example XXXII, substituting fat mixture A with an identical amount of the following fat mixture C:

Fat Mixture C

| | |
|---|---|
| High phosphatidylcholine lecithin | 1.4 |
| Anhydrous milk fat stearine fraction | 2.0 |
| Malaysian cocoa butter, stearine fraction | 48.3 |
| Caprenin | 48.3 |

EXAMPLE XXXVI

A reduced fat chocolate composition is prepared by repeating the procedure of Example XXXII, substituting fat mixture A with an identical amount of the following fat mixture D:

Fat Mixture D

| | |
|---|---|
| High phosphatidylcholine lecithin | 1.4 |
| Anydrous milk fat stearine fraction | 2.0 |
| Kaopreme E | 48.3 |
| Caprenin | 48.3 |

EXAMPLE XXXVII

A reduced fat chocolate composition is prepared by repeating the procedure of Example XXXII, substituting fat mixture A with an identical amount of the following fat mixture E:

Fat Mixture E

| High phosphatidylcholine lecithin | 1.4 |
|---|---|
| Anhydrous milk fat stearine fraction | 2.0 |
| West African cocoa butter | 96.6 |

This chocolate is tempered after conching because of the substitution of fat mixture E which contains cocoa butter (not moldable).

EXAMPLE XXXVIII

A reduced fat chocolate is prepared by repeating the procedure of Example XXV substituting the fat components (hypoallergenic butter fat, deodorized Malaysian cocoa butter, stearine fraction, caprenin and soy lecithin) with an identical total amount of fat mixture C, with the exceptions that (i) the anhydrous milk fat stearine is clarified for hypoallergenic usage, and (ii) 0.4% of high phosphatidylcholine lecithin is added late in the conching stage.

EXAMPLE XXXIX

A reduced fat chocolate (24% fat), which is hypoallergenic as to its chocolate component but less so for its dairy component, was prepared by repeating the procedure of Example XXV with the exceptions that (i) a heat-treated skim milk was substituted for the hypoallergenic whey permeate, (ii) the fat component (hypoallergenic butter fat, deodorized Malaysian cocoa butter, caprenin and soy lecithin) was replaced with an identical amount of fat mixture "F" described below, and (iii) 0.3% of the high phosphotidal cholyne content lecithin of fat mixture F was added late in the conching stage. The material was conched at 135° F. for four hours.

Fat Mixture F:

| Cocoa butter | 86.8% |
|---|---|
| Anhydrous milk fat stearine fraction | 8.3% |
| Anhydrous milk fat | 4.1% |
| High phosphatidylcholine lecithin | 0.8% |

The total composition ingredients are listed below:

| Fat Mixture F | 24.2% |
|---|---|
| High heat treated skim milk powder (replacement for milk permeate powder) | 14.0% |
| Supercritical $CO_2$ treated cocoa powder, defatted | 7.0% |
| Sugar | 54.3 |
| Vanillin (instead of natural vanilla) | 0.05% |
| High phosphatidylcholine (added late in conching stage) | 0.3% |

EXAMPLE XL

A reduced fat chocolate (24% fat) for enrobing, panning and molding, hypoallergenic for its chocolate content but less so for its dairy component, was prepared by repeating the procedure of Example XXV with the following modifications (i) a heat-treated skim milk was substituted for the hypoallergenic whey permeate, (ii) the fat component (hypoallergenic butter fat, deodorized Malaysian cocoa butter, caprenin and soy lecithin) was replaced with an identical amount of fat mixture "G" described below, and (iii) 0.3% of the high phosphotidal choline content lecithin of fat mixture G was added late in the conching stage. The material was conched at 135° F. for four hours.

Fat Mixture G:

| Hydrogenated fractionated palm and cottonseed oils, CLSP 870 Van Den Bergh Foods Company | 86.8% |
|---|---|
| Anhydrous milk fat stearine fraction | 8.3% |
| Anhydrous milk fat | 4.1% |
| High phosphatidylcholine lecithin | 0.8% |

The total composition ingredients are listed below:

| Fat Mixture G | 24.2% |
|---|---|
| High heat treated skim milk powder (replacement for milk permeate powder) | 14.0% |
| Supercritical $CO_2$ treated cocoa powder, defatted | 7.0% |
| Sugar | 54.3 |
| Vanillin (instead of natural vanilla) | 0.05% |
| High phosphatidylcholine (added late in conching stage) | 0.3% |

EXAMPLE XLI

A standard of identity, reduced-fat chocolate was prepared as follows. A fat mixture "H" was prepared by mixing 2.64 lbs of anhydrous milk fat stearine fraction, 1.4 lbs anhydrous milk fat, 11.2 lbs cocoa butter and 0.2 lbs high phosphatidylcholine lecithin. 15.5 lbs of fat mixture H was combined with 1 lb of supercritical $CO_2$-defatted cocoa powder, 14 lbs of nonfat milk powder, 0.05 lb vanillin, 80.05 lbs sucrose, 0.25 lbs cocoa butter, and 16 pounds of liquid $N_2$-treated chocolate liquor. The mixture was conched at 135° F. for 4 hours. An additional 0.3 lbs of high phosphatidylcholine was added late in the conching. The fat composition was 23.5 wt %.

EXAMPLE XLII

A bakery milk chocolate compound coating was prepared as follows. A fat mixture "I" was prepared by mixing 22.0 lbs palm kernel oil, 1.32 lbs anhydrous milk fat stearine fraction and 0.2 lbs high phosphatidylcholine-content lecithin. 23.52 lbs of fat mixture I was combined with 89.36 lbs sucrose, 9.26 lbs non-fat milk, 0.1 lb vanillin and 0.1 lb NaCl. The mixture was conched for 4 hours at 140° F. and 2–3 rps. An additional 0.3 lb of high phosphatidylcholine-content lecithin was added in the final stages of conching.

All references cited with respect to synthetic, preparative and analytical procedures are incorporated herein by reference.

The present invention may be embodied in other specific forms without departing from the spirit or essential attributes thereof and, accordingly, reference should be made to the appended claims, rather than to the foregoing specification, as indicating the scope of the invention.

I claim:

1. A chocolate or chocolate-style hypoallergenic composition comprising:
   (a) cocoa powder which has been treated with a supercritical fluid, whereby the cocoa powder has been rendered essentially hypoallergenic, and whereby there is an essential absence of birefringent starch granules in the cocoa powder upon polarizing microscopic examination;
   (b) fat;
   (c) one or more sweeteners; and
   (d) an optional dairy component.

2. A composition according to claim 1 comprising, on a wt. % basis, from about 0.5 to about 75% of coca powder; from about 10 to about 60% fat; from about a trace amount to about 75% sweetener; and from about zero to about 60% of the dairy component.

3. A composition according to claim 2 comprising, on a wt. % basis, from about 5 to about 40% of cocoa powder; from about 20 to about 24% fat; from about 25 to about 45% sweetener; and from about 10 to about 25% of the dairy component.

4. A composition according to claim 3 wherein the fat content of the cocoa powder is not more than about 12% of the cocoa powder, by weight.

5. A composition according to claim 1 including a dairy component which comprises a hypoallergenic dairy permeate.

6. A composition according to claim 5 wherein the fat content of the hypoallergenic cocoa powder is less than about 1 wt. %.

7. A composition according to claim 1 including a dairy component which is a dairy protein concentrate comprising a hypoallergenic dairy permeate having a fat content of no more than about 0.1%.

8. A composition according to claim 7 wherein the fat content of the hypoallergenic dairy permeate is no more than about 0.05%.

9. A composition according to claim 8 wherein the fat content of the hypoallergenic dairy permeate is essentially zero.

10. A composition according to claim 1 further comprising from about 0.5 to about 75% liquid nitrogen-treated chocolate liquor.

11. A composition according to claim 10 wherein the amount of liquid nitrogen-treated chocolate liquor is at least about 10%.

12. A composition according to claim 11 which is tolerated by the migraine population.

13. A composition according to claim 1 wherein the fat comprises cocoa butter or optionally deproteinized anhydrous milk fat.

14. A composition according to claim 13 wherein the fat comprises a stearine fraction of cocoa butter or optionally deproteinized anhydrous milk fat.

15. A composition according to claim 1 wherein the fat includes a phospholipid in the amount of from about 0.1 to about 0.6%, based upon the total composition weight.

16. A composition according to claim 15 wherein from about 35% to about 100% of the phospholipid by weight is phosphatidyl choline.

17. A composition according to claim 1 wherein the sweetener comprises saccharin, aspartame, acesulfame-K or a polyol sweetener.

18. A composition according to claim 1 wherein the sweetener is a polyol sweetener selected from the group consisting of maltitol, lactitol, mannitol, xylitol, sorbitol, and combinations thereof.

19. A composition according to claim 1, wherein the dairy component comprises a hypoallergenic dairy permeate which comprises a milk permeate.

20. A composition according to claim 1 wherein the dairy component comprises a hypoallergenic dairy permeate which comprises a whey permeate.

21. A composition according to claim 20 wherein the whey permeate is pasteurized and refrigerated within about 15 minutes of collection.

22. A composition according to claim 20 wherein the whey permeate is pasteurized within about one hour of collection.

23. A composition according to claim 20 wherein the whey permeate is pasteurized within about two hours of collection.

24. A composition according to claim 20 wherein the whey permeate is heat treated to arrest cheese making microbes.

25. A composition according to claim 20 wherein the whey permeate is treated to arrest cheese making microbes before the pH of the permeate falls more than about 0.3 pH units from the pH value at the time of collection.

26. A composition according to claim 20 at least about 99% free of allergenic milk protein.

27. A composition according to claim 26 wherein the absence of allergenic protein is ascertained by a dipstick.

28. A composition according to claim 27 wherein the dipstick is a dipstick which is capable of ascertaining the presence of 1% or less protein clinically.

29. A composition according to claim 1 further comprising grain, nuts, or a flour of either, or a combination thereof, wherein the grain, nuts, or flour of either grains or nuts, is optionally, completely or partially defatted.

30. A composition according to claim 29 containing defatted nuts.

31. A composition according to claim 29 wherein the grain or nuts comprise optionally completely or partially defatted crisp rice, peanut flour, or a combination thereof.

32. A composition according to claim 1 having a total fat content of no more than about 29 wt %.

33. A composition according to claim 32 having a total fat content of no more than about 24 wt %.

34. A composition according to claim 32 having a caloric content of no more than about 450 Kcal per 100 grams.

35. A composition according to claim 34 having a caloric content of no more than about 350 kcal per 100 grams.

36. A composition according to claim 35 having a caloric content of no more than about 400 Kcal per 100 grams.

37. A composition according to claim 1 which is tolerated by the migraine population.

38. In a hypoallergenic beverage the improvement comprising the inclusion, as a chocolate-style flavoring, of cocoa powder which has been treated with a supercritical fluid, whereby the cocoa powder has been rendered essentially hypoallergenic, and whereby there is an essential absence of birefringent starch granules in the cocoa powder upon polarizing microscopic examination.

39. A beverage according to claim 38 comprising a chocolate soda.

40. A beverage according to claim 38 comprising a chocolate syrup.

41. A beverage according to claim 38 comprising soda water, citric acid, one or more sweeteners and hypoallergenic cocoa powder.

42. A moldable chocolate composition comprising:
(a) cocoa powder which has been treated with a supercritical fluid, whereby the cocoa powder has been rendered essentially hypoallergenic, and whereby there is an essential absence of birefringent starch granules in the cocoa powder upon polarizing microscopic examination;
(b) fat which has stability at room temperature or in excess of about room temperature; and
(c) one or more sweeteners.

43. A composition according to claim 42 further comprising grain, nuts or a combination thereof.

44. A composition according to claim 42 whereby the fat is seed fat, a vegetable fat or a grain fat.

45. A composition according to claim 44 wherein the fat is a thermally stable hydrogenated palm kernel oil.

46. A hypoallergenic chocolate-style flavoring composition comprising from about 0.5 to about 75% cocoa powder which has been treated with a supercritical fluid whereby the cocoa powder has been rendered essentially hypoallergenic and whereby there is an essential absence of birefringent starch granules in the cocoa powder upon polarizing microscopic examination, from about 10 to about 60% fat, and from zero to about 5% other flavoring.

47. A flavoring composition according to claim 46 wherein the other flavoring comprises salt, vanilla flavor, or combinations thereof.

48. A composition comprising:
  (a) cocoa powder which has been treated with a supercritical fluid, whereby the cocoa powder has been rendered essentially hypoallergenic, and whereby there is an essential absence of birefringent starch granules in the cocoa powder upon polarizing microscopic examination; and
  (b) a dairy component.

49. A composition according to claim 48 wherein the hypoallergenic cocoa powder has been prepared by solvating cocoa powder with supercritical $CO_2$.

50. A composition according to claim 48 wherein the weight ratio of the coca powder to the dairy component is from abut 1:2 to about 3:1.

51. A composition according to claim 48 having a caloric content of no more than about 2.5 Kcal per gram.

52. A composition according to claim 51 having a fat content of no more than about 1% by weight.

53. A composition according to claim 48 wherein the hypoallergenic cocoa powder has been prepared by treating cocoa powder with supercritical $CO_2$.

54. A process for preparing a chocolate-flavored hypoallergenic composition comprising:
  (a) mixing cocoa powder rendered essentially hypoallergenic by treatment with a supercritical fluid solvent and a hypoallergenic dairy permeate, and
  (b) heat-treating the mixture at a temperature of at least about 145° F. for at least about one-half hour.

55. A process according to claim 54 wherein the cocoa powder has been processed by defatting treatment with the supercritical fluid such that there is an essential absence of birefringent starch granules in the powder, as indicated by the absence of a Maltese Cross upon polarizing microscopic examination of the powder.

56. A process for preparing a chocolate-flavored composition comprising:
  (a) mixing at least partially defatted cocoa powder and a dairy component;
  (b) heat-treating the mixture at a temperature of at least about 145° F. for at least about one-half hour;
  (c) drying said mixture to a powder;
  (d) adding fat to the mixture, and optionally sweetener;
  (e) forming the mixture into a paste, and refining said paste to an average particle size of from about 20 to about 30 microns; and
  (f) heat-treating said paste at a temperature of from about 90° F. to about 200° F., for from about 10 minutes to about 76 hours.

57. A process according to claim 56 wherein the dairy component is a hypoallergenic dairy permeate or dairy protein concentrate.

58. A process according to claim 57 wherein the at least defatted cocoa powder is cocoa powder defatted by solvation with a supercritical fluid such that said cocoa powder has been rendered essentially hypoallergenic by said defatting treatment, and wherein the dairy component comprises a hypoallergenic dairy permeate.

59. A process according to claim 58 wherein the cocoa powder has been treated with a supercritical fluid such that microorganisms including but not limited to mold have become so processed that the resultant composition is essentially free of microorganisms.

60. A process according to claim 57 wherein fat is added to the mixture in an amount such that the total fat content of the composition is not more than about 25% by weight.

61. A process according to claim 57 wherein the fat added to the mixture includes from about 0.1 to about 0.6 wt. % phospholipid, based upon the total composition weight.

62. A process according to claim 61 wherein the phospholipid is from about 35 to about 100% phosphatidyl choline, by weight of said phospholipid.

63. A process according to claim 57 wherein the at least partially defatted cocoa powder is cocoa powder defatted by treatment with a supercritical fluid such that said cocoa powder has been rendered essentially hypoallergenic by said defatting treatment, and wherein the dairy component comprises a hypoallergenic dairy permeate.

64. A process according to claim 63 wherein the cocoa powder has been processed by defatting treatment with the supercritical fluid such that there is an essential absence of birefringent starch granules in the powder, as indicated by the absence of a Maltese Cross upon polarizing microscopic examination of the powder.

65. A process according to claim 63 wherein the cocoa powder has been rendered essentially tolerable by the migraine population.

66. A process according to claim 63 wherein the defatted cocoa powder has a fat content of no more than about 1%, by weight.

67. An instant chocolate-flavored soda beverage comprising:
  (a) soda,
  (b) an alkalized cocoa powder which has been rendered essentially hypoallergenic by defatting with a supercritical fluid, and
  (c) an acid.

68. An instant chocolate-flavored soda beverage according to claim 67 wherein the alkalized cocoa powder has been processed by treatment with the supercritical fluid such that there is an essential absence of birefringent starch granules in the powder, as indicated by the absence of a Maltese Cross upon polarizing microscopic examination of the powder.

69. A beverage according to claim 68 wherein the cocoa powder becomes so processed that the cocoa powder is tolerated by the migraine population.

70. A beverage according to claim 63 wherein the acid comprises citric acid.

71. A beverage according to claim 63 wherein the cocoa powder has been alkalized with potassium carbonate.

72. A beverage according to claim 63 comprising a sweetener.

73. A method for preparing an instant chocolate-flavored soda beverage comprising combining (a) soda, (b) an acid, and (c) an alkalized cocoa powder which has been rendered essentially hypoallergenic by defatting with a supercritical fluid, whereby the acid reacts with the alkalized cocoa powder to release carbonation in an instant fashion.

74. A method according to claim 73 wherein the alkalized cocoa powder has been processed by treatment with the supercritical fluid such that there is an essential absence of birefringent starch granules in the powder, as indicated by the absence of a Maltese Cross upon polarizing microscopic examination of the powder.

75. A method according to claim 73 comprising the further step of adding a sweetener to the beverage.

76. A method according to claim 71 wherein the acid comprises citric acid.

77. A method according to claim 71 wherein the cocoa powder has been alkalized with potassium carbonate.

78. A method according to claim 71 further comprising adding a sweetener to the beverage.

79. A method according to claim 71 wherein the cocoa powder has been rendered essentially hypoallergenic by defatting with supercritical carbon dioxide as the supercritical fluid.

80. A method for preparing an instant chocolate-flavored soda beverage comprising combining (a) soda, (b) an acid, and (c) an alkalized cocoa powder which has been rendered essentially hypoallergenic by solvation with a supercritical fluid, whereby there is an essential absence of birefringent starch granules in the cocoa powder upon polarizing microscopic examination, and whereby the acid reacts with the alkalized cocoa powder to release carbonation in an instant fashion.

81. A method according to claim 80 wherein the cocoa powder has been treated with a supercritical fluid such that microorganisms including but not limited to mold have become so processed that the resultant soda beverage is essentially free of microorganisms.

82. A standard of identity reduced fat chocolate produced without the addition of water, which chocolate has a fat content of no more than 24% and includes at least 10% chocolate liquor which has been rendered essentially hypoallergenic by treatment with a supercritical fluid or liquified gas, whereby there is an essential absence of birefringent starch granules in the chocolate liquor upon polarizing microscopic examination.

83. A chocolate according to claim 82 wherein at least a portion of the fat content of the chocolate comprises a fat having a caloric density of not more than 5 Kcal per gram.

84. A reduced fat chocolate or chocolate compound coating containing from about 20% to about 24% fat, comprising:
   (a) cocoa powder which has been treated with a supercritical fluid or liquified gas, whereby the cocoa powder has been rendered essentially hypoallergenic and whereby there is an essential absence of birefringent starch granules in the cocoa powder upon polarizing microscopic examination;
   (b) chocolate liquor or a product of chocolate liquor which has been treated with a supercritical fluid or liquified gas;
   (c) one or more sweeteners;
   (d) one or more emulsifiers;
   (e) an optional milk component; and
   (f) added fat comprising anhydrous butter or fraction of anhydrous butter;
said chocolate or coating being produced in an anhydrous system and having the full taste, texture and functionality of chocolate.

85. A chocolate or coating according to claim 84 wherein the added fat is a reduced-calorie confectionery fat.

86. A chocolate or coating according to claim 85 wherein the caloric density of the added fat is not more than 5 Kcal per gram.

87. A reduced fat chocolate or chocolate compound coating containing from about 10% to about 28% fat, comprising:
   (a) cocoa powder which has been treated with a supercritical fluid or liquified gas, whereby the cocoa powder has been rendered essential hypoallergenic and whereby there is an essential absence of birefringent starch granules in the cocoa powder upon polarizing microscopic examination;
   (b) chocolate liquor or a product of chocolate liquor which has been treated with a supercritical fluid or liquified gas;
   (c) one or more sweeteners;
   (d) one or more emulsifiers;
   (e) an optional milk component; and
   (f) added fat comprising anhydrous butter or fraction of anhydrous butter;
said chocolate or coating being produced in an anhydrous system and having the full taste, texture and functionality of chocolate.

88. A chocolate or chocolate compound according to claim 87 wherein the added fat is a reduced-calorie confectionery fat.

89. A chocolate or chocolate compound according to claim 88 wherein the caloric density of the added fat is not more than 5 Kcal per gram.

90. A chocolate or chocolate-style composition comprising:
   (a) chocolate liquor or cocoa powder which has been treated with a supercritical fluid or liquified gas, whereby the chocolate liquor or cocoa powder has been rendered essentially hypoallergenic, whereby there is an essential absence of birefringent starch granules in the cocoa powder upon polarizing microscopic examination, and whereby there is a reduced requirement for total fat;
   (b) fat;
   (c) one or more sweeteners; and
   (d) an optional dairy component.

91. The chocolate or chocolate-style composition of claim 90 wherein the total fat content is less than about 29%.

92. The chocolate or chocolate-style composition of claim 91 wherein the total fat content is less than about 25%.

93. The chocolate or chocolate-style composition of claim 90 wherein the chocolate or chocolate-style composition is tolerated by the migraine population.

94. A process for preparing a chocolate-flavored hypoallergenic composition comprising:
   (a) mixing cocoa powder rendered essentially hypoallergenic by treatment with a supercritical fluid solvent and a dairy component, and
   (b) heat-treating the mixture at a temperature of at least about 145° F. for at least about one-half hour.

95. A chocolate flavored beverage base, optionally instant, comprising:
   (a) alkalized cocoa powder which has been rendered essentially hypoallergenic by treatment with a supercritical fluid, whereby there is an essential absence of birefringent starch granules in the cocoa powder upon polarizing microscopic examination.
   (b) an acid,
   (c) a cream soda flavor including but not limited to a vanilla flavor,
   (d) an optional color, and
   (e) an optional preservative.

96. A beverage, carbonated beverage, or sweetened liquid comprising the beverage base of claim 95 and a sweetener.

97. The beverage base according to claim 95 wherein the acid comprises citric acid.

98. The beverage base according to claim 95 wherein the cocoa powder has been alkalized with potassium carbonate.

99. A method for preparing a instant chocolate-flavored soda beverage, optionally instant, comprising combining soda and a beverage base according to claim 95.

100. A beverage base according to claim 95 wherein the cocoa powder has been treated with a supercritical fluid such that microorganisms including but not limited to mold have become so processed that the beverage base is essentially free of microorganisms.

101. A method of making a reduced lactose and reduced calorie milk chocolate composition comprising:
 (a) mixing a dairy permeate having a reduced protein content with cocoa powder which has been defatted by treatment with supercritical $CO_2$, and
 (b) heat-treating the resulting mixture at a temperature of at least about 145° F. for at least about one-half hour.

102. The method of claim 101 wherein the protein content of the dairy permeate is no greater than about 0.25%.

103. The method of claim 102 wherein the protein content of the dairy permeate is no greater than about 0.025%.

104. A reduced lactose and reduced calorie milk chocolate composition made according to the method of claim 101.

105. The reduced lactose and reduced calorie milk chocolate composition of claim 104 wherein the protein content of the dairy permeate is no greater than about 0.25%.

106. The reduced lactose and reduced calorie milk chocolate composition of claim 105 wherein the protein content of the dairy permeate is no greater than about 0.025%.

107. The reduced lactose and reduced calorie milk chocolate composition of claim 104 wherein the composition is essentially hypoallergenic.

108. The reduced lactose and reduced calorie milk chocolate composition of claim 104 wherein the composition is tolerated by the migraine population.

* * * * *